(12) United States Patent
Jamieson

(10) Patent No.: US 8,155,951 B2
(45) Date of Patent: Apr. 10, 2012

(54) PROCESS FOR CONSTRUCTING A SEMANTIC KNOWLEDGE BASE USING A DOCUMENT CORPUS

(76) Inventor: Patrick William Jamieson, Fishers, IN (US)

( * ) Notice: Subject to any disclaimer, the term of this patent is extended or adjusted under 35 U.S.C. 154(b) by 592 days.

(21) Appl. No.: 12/417,737

(22) Filed: Apr. 3, 2009

(65) Prior Publication Data

US 2010/0063799 A1 Mar. 11, 2010

Related U.S. Application Data

(63) Continuation-in-part of application No. 10/844,912, filed on May 13, 2004, now abandoned.

(60) Provisional application No. 60/478,643, filed on Jun. 12, 2003.

(51) Int. Cl.
*G06F 17/21* (2006.01)
(52) U.S. Cl. ........................ 704/10; 704/1; 704/4; 704/9
(58) Field of Classification Search .................... 704/10, 704/4, 1, 9
See application file for complete search history.

(56) References Cited

U.S. PATENT DOCUMENTS

| | | | |
|---|---|---|---|
| 5,694,523 A | 12/1997 | Wikal | |
| 6,263,335 B1 | 7/2001 | Paik et al. | |
| 6,507,829 B1 | 1/2003 | Richards et al. | |
| 6,675,159 B1 * | 1/2004 | Lin et al. | 1/1 |
| 2003/0061025 A1 | 3/2003 | Abir | |
| 2003/0083860 A1 | 5/2003 | Abir | |
| 2003/0093261 A1 | 5/2003 | Abir | |
| 2003/0220890 A1 * | 11/2003 | Okude | 706/50 |
| 2008/0221874 A1 | 9/2008 | Cao et al. | |
| 2009/0326915 A1 * | 12/2009 | Takano et al. | 704/4 |

OTHER PUBLICATIONS

Rebholz-Schuhmann D, Kirsch H, Couto F (2005) Facts from text—Is text mining ready to deliver? PLoS Biol 3(2.
Burgun A, Bodenreider O. Mapping the UMLS Semantic Network into general ontologies. Proceedings of the American Medical Informatics Association Symposium 2001:81-5.
Langlotz C., Caldwell S. The Completeness of Existing Lexicons for Representing Radiology Report Information. J. Digital Imaging 15(1):201-205, 2002.

* cited by examiner

*Primary Examiner* — Qi Han

(57) ABSTRACT

Related free-text documents, a corpus, are used to empirically derive a semantic knowledge base through a method in which documents are segmented into unique sentences, and then used to define sentential propositions which are arranged in a knowledge hierarchy. The method takes compound natural language sentences and transforms them to simple sentences by a process that is a part of the invention. A knowledge editor enables a domain expert using the methods of the invention to map the sentences in the corpus to sentential proposition(s). The resulting knowledge base can be used to semantically analyze documents in data mining and decision support applications, and can assist word processors or speech recognition devices. The invention is illustrated in connection with radiology reports, but it has wide applicability.

14 Claims, 18 Drawing Sheets

---

Sentential Proposition: *The intervertebral disc spaces are normal.*

Semantically Equivalent Sentences in Corpus

Intervertebral disc spaces are normal.
The disc spaces are intact.
The intervertebral disc spaces appear maintained.
Disc spaces are intact and maintained.
The intervertebral body disc spaces are preserved.
The intervertebral disc spaces have been maintained.
The intervertebral disc spaces are well preserved.
The intervertebral disc spaces are preserved.
The disc spaces are all within normal limits.
The disc spaces appear intact.
The intervertebral disc spaces are also within normal limits.
The intervertebral disc spaces are normal.
The intervertebral disc spaces appear well preserved.
The intervertebral disc spaces are well maintained.
The intervertebral disc spaces are well-maintained.
Intervertebral disc spaces are maintained.
The intervertebral disc spaces appear well maintained.
Vertebral disc spaces are within normal limits.
Disc spaces appear intact.
The intervertebral disc spaces are essentially preserved.
Disc spaces are normal as well.
The disc spaces are preserved throughout.
The disc spaces are adequately preserved.
The intervertebral disc spaces are normal, as well.

Sentential Proposition: *The intervertebral disc spaces are normal.*

Semantically Equivalent Sentences in Corpus

Intervertebral disc spaces are normal.
The disc spaces are intact.
The intervertebral disc spaces appear maintained.
Disc spaces are intact and maintained.
The intervertebral body disc spaces are preserved.
The intervertebral disc spaces have been maintained.
The intervertebral disc spaces are well preserved.
The intervertebral disc spaces are preserved.
The disc spaces are all within normal limits.
The disc spaces appear intact.
The intervertebral disc spaces are also within normal limits.
The intervertebral disc spaces are normal.
The intervertebral disc spaces appear well preserved.
The intervertebral disc spaces are well maintained.
The intervertebral disc spaces are well-maintained.
Intervertebral disc spaces are maintained.
The intervertebral disc spaces appear well maintained.
Vertebral disc spaces are within normal limits.
Disc spaces appear intact.
The intervertebral disc spaces are essentially preserved.
Disc spaces are normal as well.
The disc spaces are preserved throughout.
The disc spaces are adequately preserved.
The intervertebral disc spaces are normal, as well.

Fig. 1

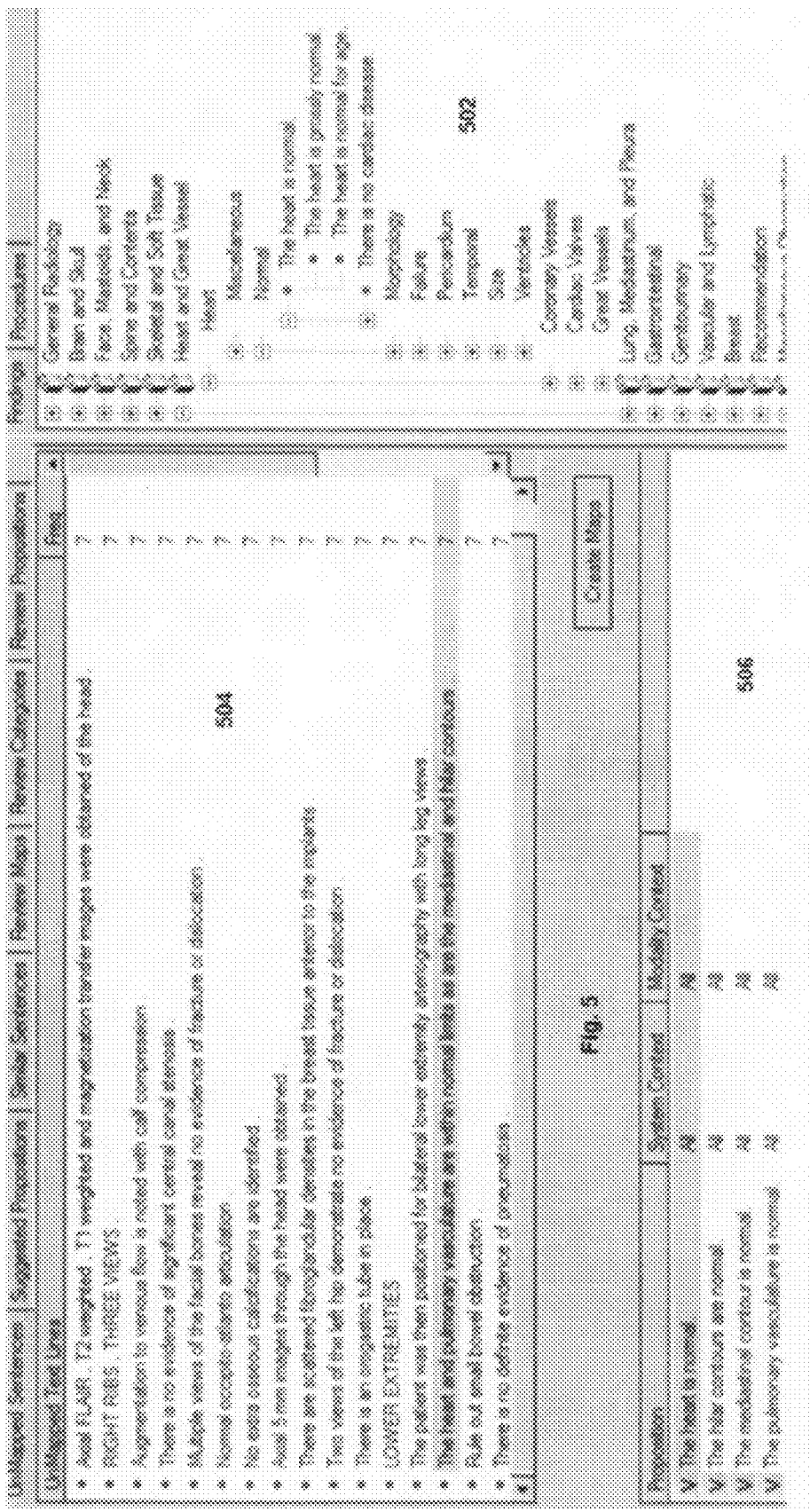

Fig. 5A

Category: Inflammation

There is no esophagitis

Proposition Type:
- Not Applicable
- Normal Finding (●)
- Abnormal Finding

Pattern Conclusion:
- Normal Conclusion
- Abnormal Conclusion

Fig. 5C

| Untagged Text Lines | Freq |
|---|---|
| • Axial images were obtained without contrast and filmed in parenchymal windows. | 8 |

601

| Proposition | System Context | Modality Context |
|---|---|---|
| | | Magnetic Resonance Imaging / Computed Tomography |
| An axial MRI study was performed. | R | R |
| An axial computed tomography imaging study was performed. | R | R |
| Parenchymal windows were used. | R | |
| No contrast was used. | R | |

PROCESS FOR CONSTRUCTING A SEMANTIC KNOWLEDGE BASE USING A DOCUMENT CORPUS

CROSS REFERENCE TO RELATED APPLICATIONS

This application is a continuation-in-part of application Ser. No. 10/844,912 titled, "Process for Constructing a Semantic Knowledge Base Using a Document Corpus", filed on May 13, 2004, and incorporated herein by reference in its entirety.

This application also claims the benefit of U.S. Provisional Application Ser. No. 60/478,643 filed on Jun. 12, 2003, which is incorporated by reference herein in its entirety

BACKGROUND OF INVENTION

This invention relates generally to the field of computerized natural language processing and, more specifically, to creating a semantic knowledge base.

In many disciplines, documents can be readily grouped together in a corpus, or document collection; in medicine, for example, one can aggregate radiology reports, electroencephalogram reports, discharge summaries, etc. These free text documents contain a great deal of knowledge in an unencoded form. However, while the value of coded information for decision support, quality assurance, and text mining is readily understood, satisfactory methods are not available for building a comprehensive semantic knowledge base efficiently and inexpensively, which can provide a means to code these free text documents. Especially vexing is the problem of representing the semantic knowledge of entire sentences in a codeable format, which then could be easily manipulated within a relational database management system.

Natural language processing (NLP) can facilitate data exchange and data mining by extracting and codifying the semantics of free-text records. However, even after a sizable investment over many years by different companies, the technology remains too immature to be used in commercial coding applications except against relatively small code sets. There are several reasons why NLP has fallen short:

Understanding human language is extremely knowledge intensive and discourse specific. Existing NLP systems do not have enough domain knowledge to correctly interpret the entire semantics of knowledge domains like radiology.

The development of a comprehensive text-mining system requires a large semantic knowledge base, which mirrors the underlying content the expert wishes to analyze. The tools and knowledge representation methods for creating this kind of knowledge are limited.

The syntactic-semantic parsing approach, which relies mainly on grammatical and lexical rules, is too rigid and cannot reliably determine the semantic equivalence of different sentence expressions for even a moderately sized knowledge domain. Furthermore, such parsing is not scalable or easily adapted as new domain knowledge becomes available.

Many systems have been proposed to semantically search free text, but they are impossible to evaluate without more precisely defining the criteria for their operation. Our invention adheres to four principles for coding free text:

Reject all sentences that are semantically invalid.

Use one proposition/symbol/code/logicalform to represent the meaning of a simple sentence.

Use the same propositions/symbols/codes/logicalforms to represent the meaning of all semantically equivalent sentences.

Reveal all propositions to the end user; if the proposition is "published," the system can index text whose meaning is represented by that proposition.

Prior art systems fail criterion one. For example consider the following sentence from an actual radiology report, "Lungs and heart are clear." Semantic parsers such as MedLee can structure and code the sentence as Clear: Lungs, Clear: Heart, but does it make sense? The writer probably meant "The heart is normal and the lungs are clear." Unfortunately, most computer systems do not possess common sense knowledge and cannot correct or make valid inferences about a writer's intention. Many computational linguists would agree with requirement two but this requires detailed domain knowledge that is often lacking. Most systems struggle with criterion three. Especially when an NLP system semantically analyzes a sentence using predicate calculus and employs a compositional lexicon, divergent codes may represent the same idea. Data mining and decision support are impaired in direct proportion to divergent coding. Finally, if propositions are not revealed up front, users will not have faith the NLP system can actually extract that meaning from free text. Users will also not be able to assess the semantic granularity or depth of the natural language processing system.

Although state of the art in information-retrieval (IR) technology makes it possible to return sentences by relevance ranking, it cannot provide answers to basic semantic queries such as "How many patients had right lower lobe pneumonia?" or "Which patients had a diffuse pulmonary infiltrate?" over a corpus. IR algorithms retrieve documents based on keywords but can not anticipate the hundreds of different possible ways the same knowledge can be embedded within a sentence. The design objective of the present invention is to represent all semantically equivalent sentences with the same proposition(s) (see example in FIG. 1).

Richards, et al. (2003), in U.S. Pat. No. 6,507,829, point out that possible combination of words in a language number in the billions, even when the length of the combination is restricted to those of five words or less, thus making it seemingly impossible to use strong methods such as string matching to identify equivalent semantics. The classification approach proposed by him used weighted N-grams to automatically code text fragments, such as adverse drug events. However, only two-thirds of these text fragments could be correctly classified. Further, one must identify prior to classification all the relevant semantics. This makes it unsuitable for classifying the semantics of a free text document collection where the classification vectors are not known in advance.

Abir, in U.S. patent applications 20030061025, 20030083860, and 20030093261 proposed an approach for associating phrases of similar meaning in various languages to translate documents from one language into another. His approach returned an association between sets of strings, but did not produce a semantic knowledge base or a means to associate sentences to discrete semantic propositions.

Paik et. al. (2001) in U.S. Pat. No. 6,263,335 teaches a domain independent system to automatically extract meaning from a corpus and build a subject knowledge base. The semantics from the corpus are extracted as concept-relation-concept (CRC) triples and stored in a database. However, there are several limitations to his approach. The semantic extraction scheme was not designed to capture the meaning of entire sentences, only those parts (principally phrases) and relations (connectors between phrases) that can be analyzed by the syntactic/semantic rule base. Semantic predicates are defined by the grammar, not the domain expert. The system can not in many cases accurately assign linguistically diverse but semantically equivalent sentences to the same CRCs, because there are potentially hundreds of different ways writers can express the same sentence meaning, and the rules for CRC extraction can not anticipate all these ways. Additionally, domain experts play no part in constructing and designing the semantic knowledge base. Thus they can not choose the preferred terms in CRCs, the predicates which relate concepts, or arrange them in a knowledge hierarchy. Finally, Paik's automatic extraction system lacks domain knowledge which humans routinely use in sentence processing. For example, in radiology, the sentence "No evidence of acute infiltrates or failure" can be logically represented as two propositions: a. There are no acute pulmonary infiltrates, and b. There is no heart failure. Notice that the word "heart" is missing in the sentence, but a physician has no trouble interpreting the correct meaning, because of the associated context of "acute infiltrates". However, it is exceedingly difficult for a computer using automated extraction rules to make this inference. Paik does not use domain experts to review semantic assignment except in ambiguous cases.

There are well known problems in the art with syntactically parsing sentences that computational linguistics have yet to solve. Experts in the field of natural language processing believe only 30% of English sentences can be structured as logical forms using automated methods [Rebholz-Schuhmann D, Kirsch H, Couto F (2005) Facts from text—Is text mining ready to deliver? PLoS Biol 3(2)]. Syntactic analysis has not solved the problem of modifier attachment. English sentences often include prepositional phrases with ambiguous modifier attachments. For example, in the sentence, "The patient has stool and gas scattered throughout the colon and rectum without evidence of free air or obstruction", it is immediately obvious to a physician that the phrase "without evidence of free air or obstruction" refers to the colon and not the rectum. Physicians disambiguate these types of sentences easily, because they have clinical knowledge which computers do not.

Additionally, a great deal of English uses non-grammatical expressions which make it difficult for natural language processing approaches which rely on syntactic analysis. For example, the 'sentences', "No intracranial hemorrhage or mass effect", "Status post median sternotomy in the interval", and "Kidneys, no hydronephrosis", are typical examples of writing in medical reports where the verb is omitted, and the subject is implied.

Most NLP systems include grammatical transformations that precede semantic analysis. However, if the parser makes an error because it cannot syntactically parse the sentence correctly; there is little chance that the semantic assignment will be done accurately.

Cao (PGPUB 2008/0221874) provides for the semantic representation of parts of sentences. Cao's approach is consistent with the work of other computational linguists that use grammatic and semantic parsing but she supplements this with human annotation. However, she cannot represent the meaning of the entire sentence. The purpose is to link words and phrases in a parse tree. For example the sentence, "I want to fly form New York to Boston" is annotated with "tags" and "labels". The "tags" are "Pron-Sub", "Intend", "Intendo", "Verb", "From" "City", "To", and "City". The "labels" are "Subject", "Intend", "Verb", "From Location", "To Location", and "S". Each word receives a "tag". Each "tag" is linked to a "label". There is no "label" that defines the meaning of the entire sentence. Semantic annotation does not cover the meaning of an entire sentence.

Wical (U.S. Pat. No. 5,694,523) teaches a content processing system that classifies the content of input discourse using a "knowledge catalog". Wical defines "knowledge catalog" as a plurality of independent and parallel static ontologies supplemented by dynamic ontologies that represent the broad coverage of concepts that define knowledge. However, Wical was not unable to represent the semantics of sentences at a granular level of detail nor does he try to represent the complex inter-relationships between words in a sentence.

Most natural language processing systems (NLP) focus on extraction heuristics over knowledge representation issues. One cannot tell if the semantics of an entire sentence can be captured, because these systems only attempt to identify a limited number of predefined concepts, rather than extracting the entire meaning of the sentence. An NLP system which extracts the entire meaning must capture and represent subtle nuances of language. It would be desirable to inspect the fidelity of annotated sentences to knowledge base entries, and quantitate the percentage of free text sentences represented in the knowledge base over a large collection of documents, both missing from the prior art.

The dominant method in computational linguistics for representing the meaning of sentences is the use of logical forms. Logical forms use a formalism that is similar to first order predicate calculus (FOPC). Logical forms include predicates that describe relations or properties, and terms which are constant expressions. For example the logical form Visualized (cervical-spine) is a one argument predicate that in this case takes the term cervical-spine. However, predicates are not limited to a single term. One could have a logical form like Degeneration (cervical-spine, severe). This logical form describes not only what is degenerated but the severity of the degeneration. FOPC also teaches more complex symbols such as variables, predicate operators, and modal operators. Defining a complete set of predicates (especially multi-valued predicates) and terms for even a moderately sized knowledge domain is an unsolved problem in computational linguistics.

The present invention does not use FOPC logical forms and thus represents a departure from the prior art. Rather the basic unit of semantic knowledge is the sentential proposition (see definition table) which can represent the meaning of an entire simple or complex sentence using a single logical symbol easily stored in a relational database. While computational linguists prefer first order predicate calculus (FOPC) because it is more expressive than sentential logic, there are several reasons sentential propositions are better suited for use in semi-automated knowledge base construction as part of the present invention:

Sentential propositions often mirror statements in natural language, making it easy for domain experts, versus computer scientists, to write them.

Sentential propositions are expressive and can capture all the significant modifiers and concepts contained in a sentence using a single logical symbol. This makes it easy to store and compare using a relational database management system.

Sentential propositions allow a semantic knowledge base to be easily organized to make semantic knowledge accessible for properly classifying unknown sentences by human experts.

While translating a FOPC logical form to a sentential proposition is possible, it can not be easily performed by a domain expert, an important design consideration of the current invention.

Other approaches to capture meaning from free text include methods from lexical semantics. For example, the medical informatics community has invested tremendous resources in creating lexicons and terminologies to index and code medical documents. A major achievement was the Unified Medical Language System [Burgun A, Bodenreider O. Mapping the UMLS Semantic Network into general ontologies. Proceedings of the American Medical Informatics Association Symposium 2001:81-5] or UMLS, which is a metathesaurus of many large-scale vocabulary systems such as ICD-9 and SNOMED. Unfortunately, even these vocabularies have limited coverage for many concepts used in medical documents. Langlotz showed that only about 45% of radiology terms were covered by UMLS. [Langlotz C., Caldwell S. The Completeness of Existing Lexicons for Representing Radiology Report Information. J. Digital Imaging 15(1):201-205, 2002.]

Additionally, lexical coding schemes do not include all the relevant words such as noun modifiers that describe medical concepts, and often do not code for all the concepts in a medical document collection. No lexicons provide the means to code the semantics of complete sentences.

Corpus based approaches for creating a semantic knowledge base of invariant symbols that represent the meaning of semantically equivalent sentences has not been proposed. The formal methods for deriving a semantic knowledge base by accurately analyzing entire sentences in a corpus requires tools and methods missing in the prior art.

The current art also fails to support the role domain experts play in constructing such a knowledge base and semantically annotating sentences. A few simple examples show why domain experts are needed. Consider the following sentence from a radiology corpus, 'Supratentorial and infratentorial brain pattern is normal.' This sentence should be annotated to the proposition, 'The brain is normal.' Yet, only someone with domain knowledge can make this inference. Or consider another sentence, 'The patient is hyper-expanded.' This should be annotated to the proposition, 'The lungs are hyper-expanded'. Domain expertise is again required to understand that in the context of a radiology report 'patient' is being substituted for 'lungs'.

Yet, by themselves, domain experts would face immense obstacles to building a knowledge base and perform semantic annotation for even a moderately sized domain. Both integrated tools and methods must support domain experts to build the required knowledge base of propositions and semantic mapping table.

Currently, there are no integrated tools and methods that would enable a domain expert to create sentential proposition (s) that reflect the underlying meaning of entire sentences within a free text record in a consistent manner. There are no inexpensive, reliable means for a domain expert to create a semantic knowledge base of codeable entries that represent in an invariant manner semantically equivalent sentences in a collection of related free text documents.

There are many applications that can be built using the knowledge base of the present invention. One such application could improve document workflow by recognizing free text sentences and graphically displaying the extracted knowledge. Another would be to build text mining engines that could search on the semantic meaning of sentences rather than just key words. Most significantly, data mining and decision support applications could take free text input, and transform them into codeable entries which would make them accessible for relational database analysis.

SUMMARY OF INVENTION

These and other objects are achieved by the present invention, which, in one aspect, is a method for creating a semantic knowledge base for a knowledge domain comprising the steps of annotating the set S of entire sentences in a corpus to the set P of unique meanings or sentential propositions in the domain. A sentential proposition is a logical unit of semantic meaning as defined in sentential calculus. Sentential calculus is a formal system of logic in which formulae using propositions, (propositions are used herein to mean sentential propositions), can be combined using logical connectives. A proposition represents all semantically equivalent sentences. For example, "The lungs are normal", represents the meaning of the following simple sentences, "The lungs are within normal limits", "Lungs are within normal limits", "The appearance of the lungs are normal", "Lungs appear normal", etc. Each sentential proposition is represented by an invariant, unique logical symbol that can be stored in a relational database management system.

If a simple sentence in the corpus is annotated to a particular proposition then all semantically equivalent sentences should be annotated to the same proposition. However, many sentences contain compound subjects, compound predicates, or are compound sentences themselves. For these sentences to be annotated, several propositions must be used, since in the preferred embodiment a sentential proposition represents the entire meaning of only a simple or complex sentence.

Many limitations and inadequacies of known methods of knowledge base development and management are overcome by the present invention, because the output of the method creates a hierarchical set of codeable, sentential propositions that can be stored in a relational database management system. Each sentential proposition is tagged with a globally unique identifier and is stored in a row in a relational database table. The propositions themselves are derived from a corpus of related documents which can be easily adapted to any of a variety of specialized domains. For example, by analyzing a large number of radiology reports, the present invention can be used to extract a hierarchical, codeable set of unique propositions representing the knowledge of the radiology domain.

The central purpose of the invention is to transform data in the form of free text from documents to symbols that are stored in a relational database management system. As conceived, the knowledge representation is directed at free text sentences in documents that describe physical and tangible objects where the codified form (proposition) is stored in a relational database management system and represents in an invariant way the same physical and tangible objects.

Unlike other text extraction systems, which attempt to extract semantic meaning at the level of words, tokens, phrases, or some N-gram combination of words, the present invention uses entire sentences as the primary unit of analysis. The advantage of using sentences for extracting semantic knowledge is they often contain important relational modifiers such as adjective clauses, adverbial clauses, or prepositional phrases. When these modifying words are not considered by prior art systems, two different sentences could be coded incorrectly. For example, there is a significant distinction between, "There are no air fluid levels seen" and "There are no air fluid levels seen in the abdomen". The present invention represents the semantic knowledge of these sentences with two unique but different propositions.

The method utilizes the storage and pattern matching capability of the computer but also relies on input from a domain expert to, for example, to determine the semantic equivalence of entire sentences. However, domain experts by themselves could not create the semantic code set without the methods and tools of the invention. For example, the invention creates a unique sentence table from a corpus sorted by frequency count, which allows the domain experts to methodically analyze and construct the semantic knowledge base so that common propositions will not be overlooked. This is necessary to prevent ad-hoc coding. Because medical code sets are not derived from their source documents, no existing medical nomenclature codes the sentence, "There is an endotracheal tube with the tip above the carina." Yet, this is a common radiology sentence since many radiology examinations check for tube or line placement. Prior art nomenclatures like SNOMED or ICD construct their semantic knowledge from the vantage point of diagnostic conditions, rather than from the actual documents to be coded, so they fail to represent such common sentences. The present invention overcomes this problem by alerting domain experts to the relative weight (and possible importance) of this sentence in the corpus. The table is sorted from highest to lowest frequency to enable domain experts to develop codes for the most common sentences.

The present invention enables domain experts to create sentential propositions in a semi-automated fashion. New propositions are added to the knowledge hierarchy as additional sentences are analyzed. The exemplary embodiment provides for software tools to substantially reduce the effort to locate the correct proposition(s) for annotating propositions to candidate sentences. When a suitable proposition cannot be found, domain experts can easily add a new proposition to the knowledge hierarchy, often using words that are very similar to the sentence being classified. Yet the domain expert has a distinct advantage over any purely automated system—namely, they can choose the preferred words in constructing the proposition. This can assist sentence annotators in mapping the sentences in the corpus to their respective propositions.

The invention substantially solves the knowledge representation problem for representing the semantics of related sentences in free text documents. Although in theory there may be billions of ways to express a sentence in a domain for a given proposition(s), using frequency counting one finds empirically there are far fewer actual ways when examining a corpus of related documents. The most probable sentence variants to a given proposition often number in the hundreds or thousands. Thus by annotating these variants to the same proposition(s) one can have great confidence that coding the underlying text is accurate because strong string matching methods are used, over weaker statistical methods. As more sentences are analyzed and stored in the semantic mapping table non-codeable sentence entries are reduced. The semantic knowledge base codes are derived from the corpus itself with the most common propositions added to the knowledge base first.

BRIEF DESCRIPTION OF DRAWINGS

These and other features of the Subject Invention will be better understood in relation to the Detailed Description taken in conjunction with the Drawings, of which:

FIG. 1 is a partial output of sentences from a corpus that are mapped/annotated to the proposition, "The intervertebral disc spaces are normal."

FIG. 5 is a rendering of a computer screen depicting the user interface of one component of the knowledge-editor, which assists the domain expert in the selection of sentential propositions that could be used to annotate a sentence from a medical corpus.

FIG. 5A is a rendering of a computer screen depicting the user interface of one component of the knowledge-editor that implements the sentence mapping to sentential proposition aspect of the invention. The upper window displays sentences from the unique sentence table and the lower window displays "hypothesized propositions".

FIG. 5C is a rendering of a computer screen depicting the user interface of one component of the knowledge-editor that enables a domain expert to create a new proposition.

FIG. 6 is a rendering of a computer screen depicting the user interface of one component of the knowledge-editor, which allows the domain expert to add a context maker to annotate an ambiguous sentence to several propositions.

FIG. 9 is a bitmap rendering of a computer screen showing the larger context of a complete medical report for a sentence about to be annotated.

Figure 2:
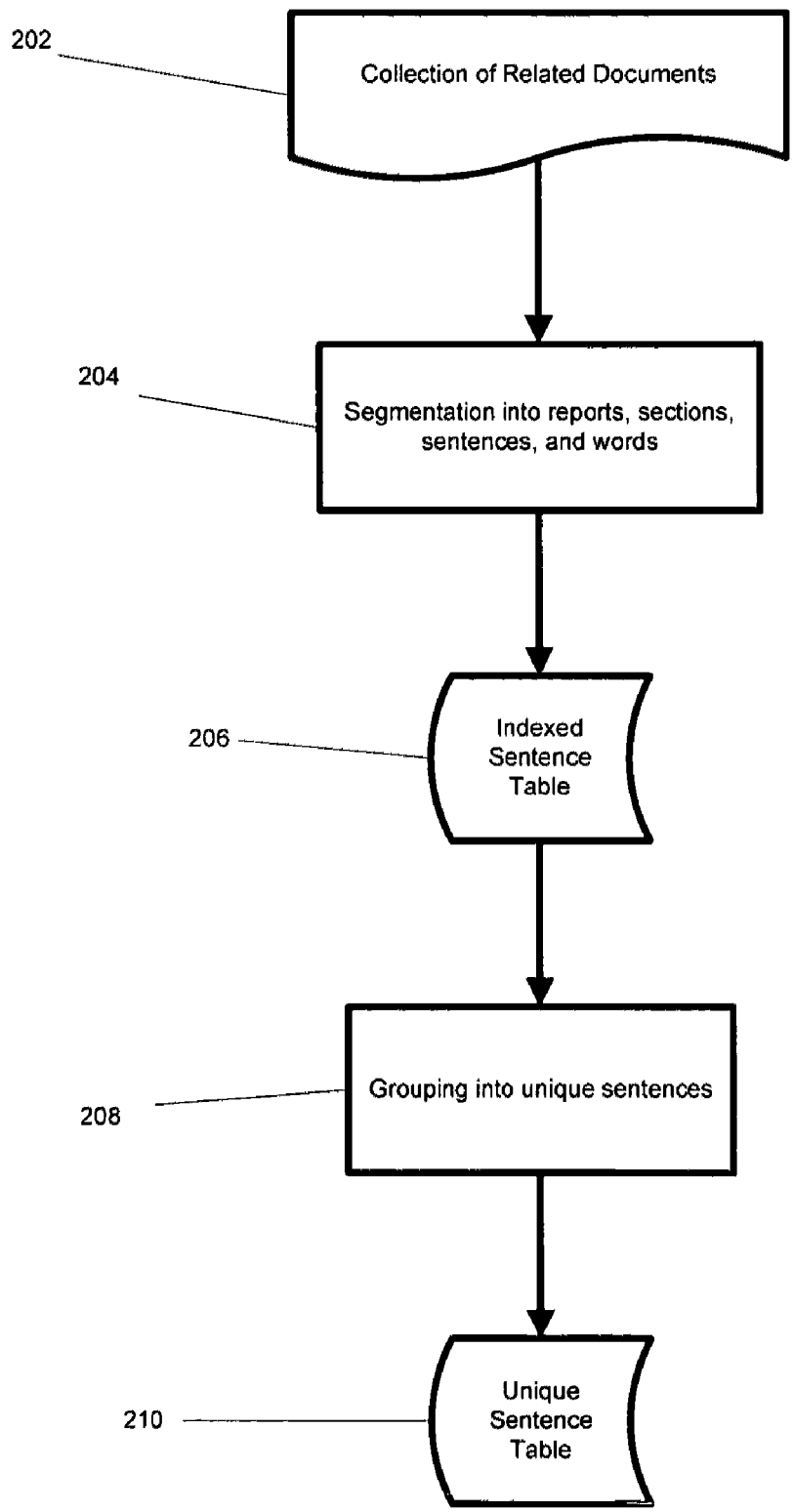
FIG. 2 is a block diagram illustrating the steps in transforming a corpus of related documents into a table of unique sentence elements.

Understanding that these drawings depict only typical embodiments of the invention and are not to be construed to limit its scope, and that certain features in the drawings are not necessarily to scale, and certain features may be exaggerated in order to better illustrate and explain the present invention, the invention will be described in detail.

DETAILED DESCRIPTION

Unless otherwise stated, the following meanings should be attached to the following terms;

| Term | Definition |
|---|---|
| Sentence | A string of words usually delimited by punctuation or other distinctive formatting which can be represented by one or more sentential propositions. Sentences may include phrases, complements, adverbials, clauses, and other associated structures. |
| Sentence fragment | A string of words often not delimited by punctuation or other distinctive formatting. |
| Simple Sentence | A basic sentence with a single clause. |
| Compound Sentence | A sentence composed of at least two independent clauses joined by a coordinating conjunction, a correlative conjunction, or a semicolon. |
| Unmappable Sentences | A sentence that can not be mapped to one or more sentential propositions because it is either invalid, contains sensitive information, or can not be represented using the formalisms of sentential logic. Such sentences are marked with the attribute "delete", "invalid", or "skip" or a similar attribute to avoid placing them in the semantic mapping table. |
| Compound Subject | A subject with two or more nouns or pronouns joined by the word and or another conjunction. Compound subjects share the same predicate. |
| Predicate | A word or group of words that tells what the subject is doing or being. The term predicate is also used in FOPC, but as used here is primarily referred to the predicate of a sentence. |
| Compound Predicate | A predicate with two or more verbs joined by the word "and" or another conjunction |
| Complex Sentence | A sentence with an independent clause and at least one dependent clause (subordinating clause). |
| Sentence Reduction | The process of creating a multiplicity of simple or complex sentences from a sentence that has either a compound subject, compound predicate, or is compound itself, according to the methods of the present invention. For sentences that are already simple or complex the reduction merely returns the same sentence. |
| Sentential Proposition | Atomic unit of semantic meaning capturing the knowledge within a simple or complex sentence as used in propositional calculus (or sentential calculus), a formal system of logic. Herein simply referred to as proposition in this document. Sentential propositions are represented in a computer database by a single logical symbol. |
| Statement | The actual words the make up the sentential proposition in contrast to the logical symbol stored in a computer database. |
| Candidate Propositions | One or more computer hypothesized propositions that cover the meaning of a sentence in the corpus. Candidate propositions are usually determined by similarity metrics to known mapped sentences or propositions. |
| Semantic Type | A label or set of labels that characterize a proposition into one or more general categories. In the medical domain this could include "normal" and "abnormal". |
| Knowledge Domain | The knowledge within a specialized disciple such as radiology, pathology, astronomy, contract law, etc. |
| Knowledge Base | The set of unique propositions that represent the knowledge within a specialized field of study, such as radiology, as derived from a document corpus. Also called a semantic knowledge base. |
| Canonical Knowledge Base | The set of all unique propositions that represent the knowledge within a specialized field of study, such as radiology, as derived from a document corpus. |
| Document Corpus | A large collection of related documents or reports from a knowledge domain from which a semantic knowledge base can be derived. Also called a corpus. |
| Semantic Annotation | The process of selecting a sentence from a document corpus and assigning one or more meanings represented by propositions in the semantic knowledge base. Also known as "mapping" or "annotating" sentences to proposition(s), or alternately a sentence is "mapped" or "annotated" to one or more proposition(s). |
| Semantic Equivalence | Sentences which use different words but having the same meaning. Semantically equivalent sentences are represented by the same logical units of meaning, i.e. propositions or sentential propositions. |
| Semantic Mapping Table | A table, usually a relational database table, which holds the links between unique sentences from a corpus and its underlying semantic proposition(s). Semantically equivalent sentences are represented by the same proposition(s). Also called a mapping table. |
| Semantic Validation | The process where a second domain experts approves/validates the semantic mapping of a sentence by a first domain expert. |
| Semantic Correction | The process where a second domain expert corrects the mapping of a sentence by a first domain expert. |
| Context Marker | A piece of information used to resolve the mapping of an ambiguous sentence to the correct proposition(s), which lies outside the sentence, but is contained within the document. The context marker can be stored as a field in the semantic mapping table. |
| Context Marker Category | A grouping of like context markers. |
| Contextual equivalence | Sentences judged semantically equivalent only after their document context (through a context marker) is specified. |
| Semantic Hierarchy | A taxonomic arrangement of semantic propositions, using knowledge categories to facilitate browsing. Such arrangements may include subsumption, "is-a", "part-of", and causal relationships. |
| Subsumption | The arrangement of semantic units in which the most general ideas (sentential propositions) of the knowledge domain are presented at a higher level and progressively differentiated propositions are displayed at a lower level. |
| Knowledge Editor | A tool that enables a domain expert to semantically annotate sentences and add or edit propositions in a knowledge base. Also called semantic editor. The knowledge editor displays candidate propositions to a sentence that needs to be mapped, and the knowledge hierarchy of propositions. |
| Domain Expert | A skilled professional who can create new propositions and semantically annotate sentences for a particular knowledge domain. |

Examples

The following examples are provided to better understand the method. The fundamental unit of what is asserted in the knowledge base is a sentential proposition, a logical unit of semantic meaning, which in the preferred embodiment is expressed through a declarative statement. Propositions are distinct from the sentences that convey them, although they are related. For example, the sentences "The chest x-ray is normal", "The chest x-ray appears to be normal", and "The chest x-ray appears unremarkable", etc. all can be represented by the same proposition.

In the exemplary embodiment the basic unit of semantic meaning is a sentential proposition, a logical assertion using declarative language with no internal structure. This is in contrast to predicate logic, where predicates and terms are used to represent meaning.

In the exemplary embodiment, propositions in the knowledge base are always true. A simple proposition does not have connectives or quantifiers. A compound proposition is one created using one or more of the logic operators of negation, conjunction, disjunction, and implication The following are examples of simple propositions: "The colon is of normal caliber.", "There are diffuse bilateral pulmonary infiltrates." "There is a small left pleural effusion" and "There are calcified granulomas."

The following are examples of compound propositions: "There is no evidence of fracture or dislocation.", "The mediastinum is normal in size and contour.", and "The heart size and pulmonary vasculature are within normal limits."

In the exemplary embodiment, compound propositions are not used; rather a compound subject, predicate, or sentence is annotated or represented by multiple simple propositions.

The method in the exemplary embodiment creates a single entry in the knowledge base that encompasses not only terms, but their relations (predicates), and modifiers using a sentential proposition. Each sentential proposition is identified with a unique identifier that makes it easy to store within a relational database management system (RDBMS).

The initial steps for the method are shown in the flow-chart of FIG. 2. The domain expert assembles a collection of related documents, in step 202, preferably in electronic form to create a corpus. The corpus should be very large, consisting of greater than 100,000 documents, to increase the probability that most of the relevant propositions in the knowledge domain are contained in the corpus. One or more computer algorithms are used to segment or parse the corpus into individual documents, sections, sentences, and words, step 204. There are a variety of algorithms that could be used by persons skilled in the art of natural language processing, including open source segmentation tools which can perform this step. In the preferred embodiment regular expressions are used to recognize the period at the end of the sentence. However, sentence segmentation based on Hidden Markov Models could also be used. Next an indexed table is created to hold these entries, step 206. The indexed table provides a mechanism to associate words, sections, and documents with each sentence. Process step 208 compares these sentences by their string characteristics. For every string in the indexed table not equal to a string that has been previously entered, a new entry in the unique sentence table, store 210, is created. If the two strings are equal, the frequency occurrence for that entry is incremented by one.

Figure 3:
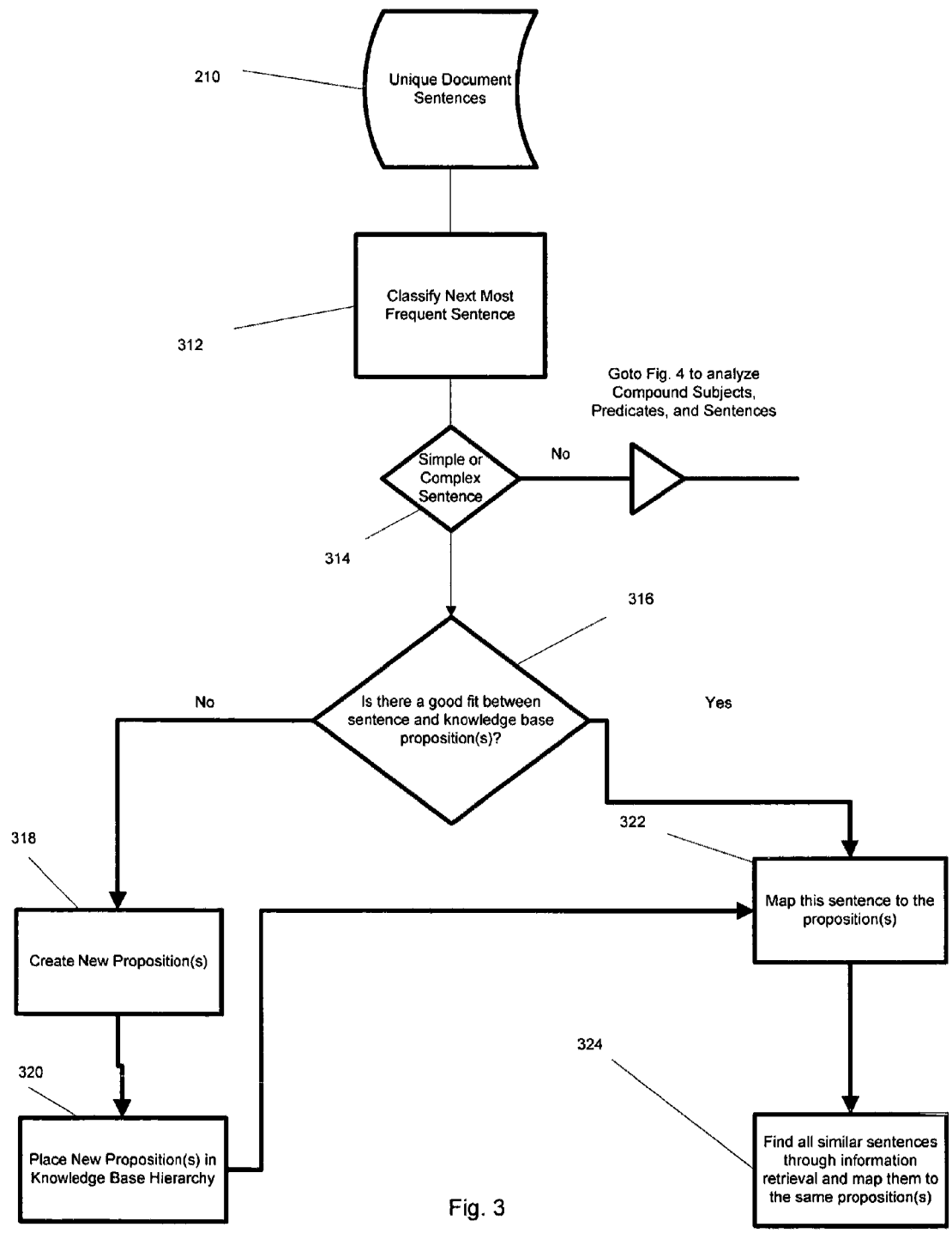
FIG. 3 is a block diagram illustrating the steps of classifying a simple, declarative sentence into one proposition in the knowledge base.
Figure 4:
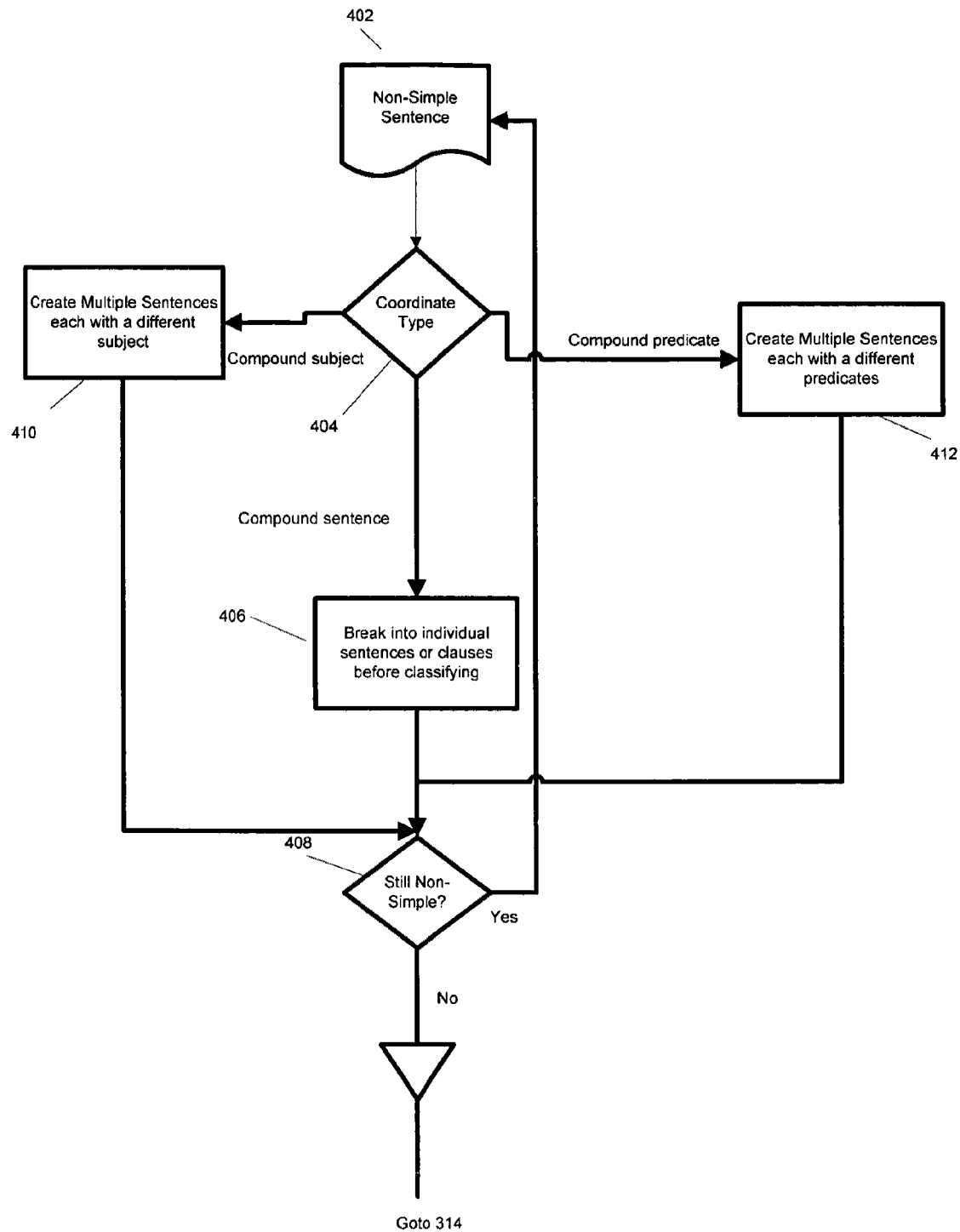
FIG. 4 is a block diagram illustrating the steps for breaking down a sentence from among the list of a compound sentence, a sentence with a compound subject, a sentence with a compound predicate, or any combination thereof into simpler sentences, which can then be annotated with either existing or new propositions.

FIG. 3 shows the steps for classifying entries from the unique sentence table and creating sentential propositions which represent their meanings in the knowledge base. The first decision point, 314, determines the type of sentence the domain expert is analyzing. If the sentence has a compound subject, predicate, or is a compound sentence itself, the additional steps in FIG. 4 are used. For example the sentence, "The heart size and pulmonary vasculature are within normal limits," has a compound subject so analysis for this particular sentence requires the steps in figure four, which will be described shortly. However the sentence, "The heart size is enlarged" is simple and a domain expert annotates this sentence to an existing sentential proposition in the knowledge base, or creates a new sentential proposition if it does not exist.

Figure 10:
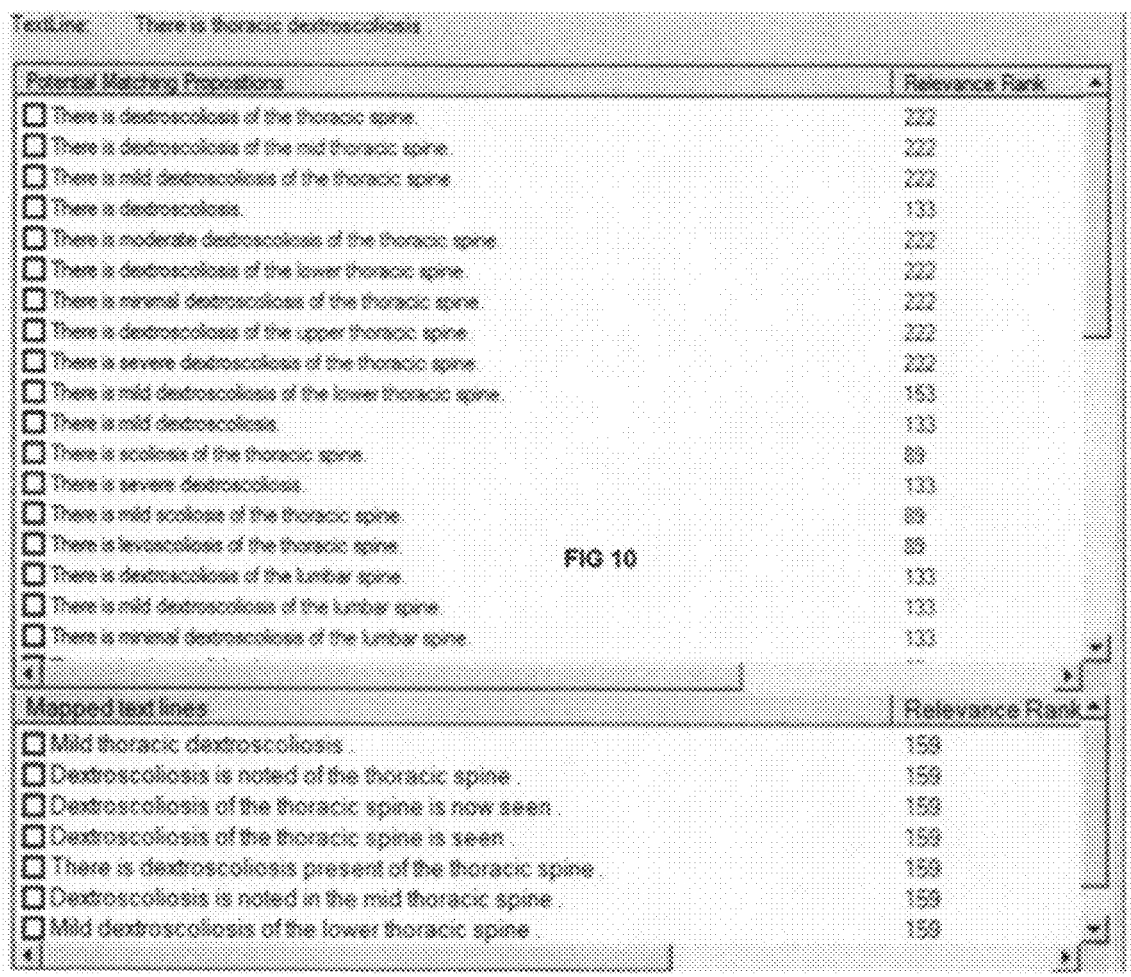
FIG. 10 is a bitmap rendering of a computer screen showing a component of the user interface of a knowledge editor that enables a domain expert to select from candidate sentential propositions that may map a sentence from the corpus.

The knowledge editor allows a domain expert to rapidly select the correct propositions which "map/cover" a sentence by suggesting candidate propositions. FIG. 10 illustrates potential matching propositions in the upper half of the window to one sentence from the corpus: "There is thoracic detroscoliosis." The propositions are listed primarily by relevance rank to propositions in the knowledge base. The domain expert can select one or more of these propositions in order to semantically annotate the sentence. In the exemplary embodiment, the unknown sentence is compared to the propositional statements using the free text "contains" predicate (found in the full text search engine of the Microsoft Sql2000 RDBMS), and the list is sorted in descending rank order and minimum edit distance to the target or unknown sentence. If the domain expert clicks the button "create maps" shown in FIG. 5 an association is made between the sentence and the selected sentential proposition(s) and stored in the semantic mapping table, which in the preferred embodiment is a table in a relational database management system.

Figure 13:
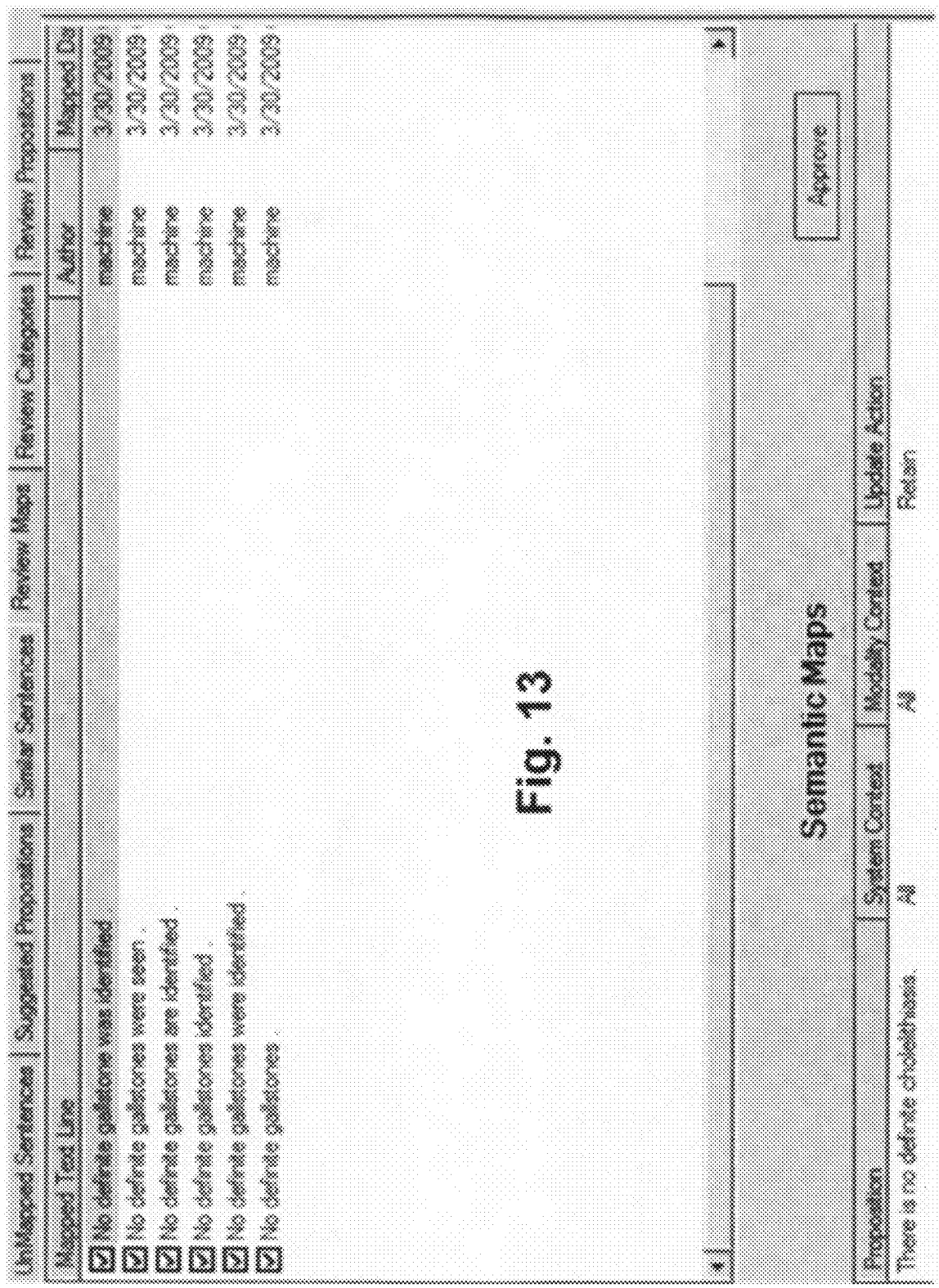
FIG. 13 is a bitmap rendering of a computer screen showing one component of the user interface of the knowledge editor that displays similar sentences from the corpus that have been automatically mapped by a machine algorithm.

The knowledge editor also assists the domain expert by locating similar sentences in the corpus to a previously mapped sentence. It does this by transforming each non-stop word in the sentence into a base form or stem. In the preferred embodiment the public domain Porter Stemmer algorithm is used to perform this transformation, but other algorithms could be used by those knowledge in the art of natural language processing. Each stem is then further transformed into a numeric code through the use of a code lookup table that has a dictionary of all the words in the corpus. The dictionary is first be created by scanning for all the unique words in the corpus and assigning them a numeric code. The entire sentence is then transformed into a numeric code set sorted from the lowest to the highest code. For example, the sentence in FIG. 13, "No definite gallstone was identified" is transformed to the numeric code set, "33, 34, 452." Empirical research has established that in one corpus all sentences with the same code set have a very high chance of mapping to the same sentential propositions. In those cases where it is not true the domain expert can correct the semantic mapping using the tool in FIG. 14.

Figure 14:
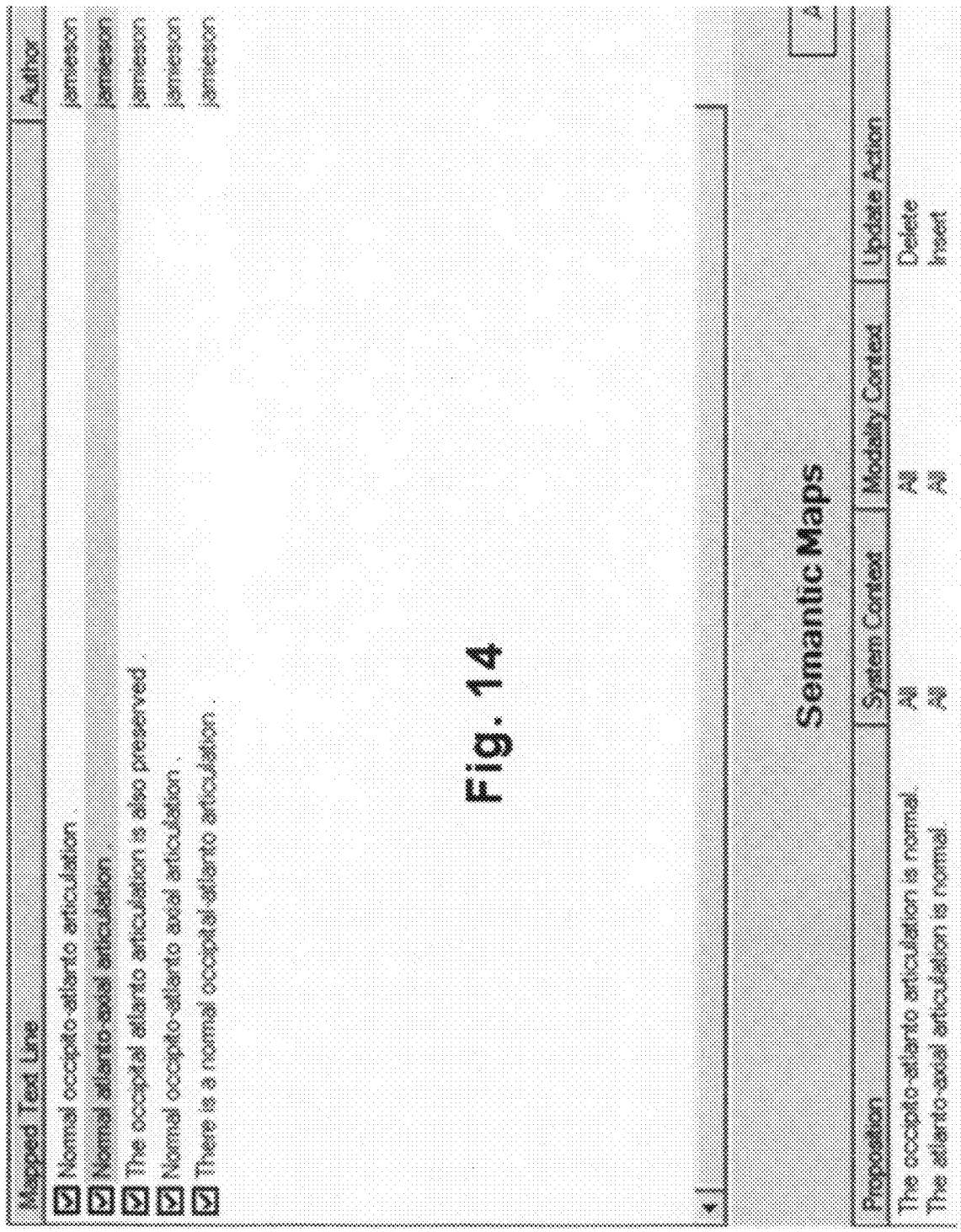
FIG. 14 is a bitmap rendering of a computer screen showing one component of the user interface of the knowledge editor that displays how a second domain expert can correct or approve the semantic mapping of another domain expert.

FIG. 14 shows an aspect of the knowledge editor that enables a second domain expert to review, approve, and correct a previous semantic annotation by a first domain expert. In this example, the highlighted sentence, "Normal atlanto-axial articulation" has been inappropriately mapped to the sentential proposition, "The occipito-atlanto articulation is normal". The reviewer updates the mapping by deleting the wrong proposition and inserting the correct mapping, "The atlanto-axial articulation is normal". All changes are tracked in a review table. Once all the updates are made the reviewer can click the approve button which updates fields in the map review table showing who approved the tentative mapping of the sentence. These measures are designed to ensure a high quality mapping of corpus sentences to propositions that is missing in the prior art.

Figure 11:
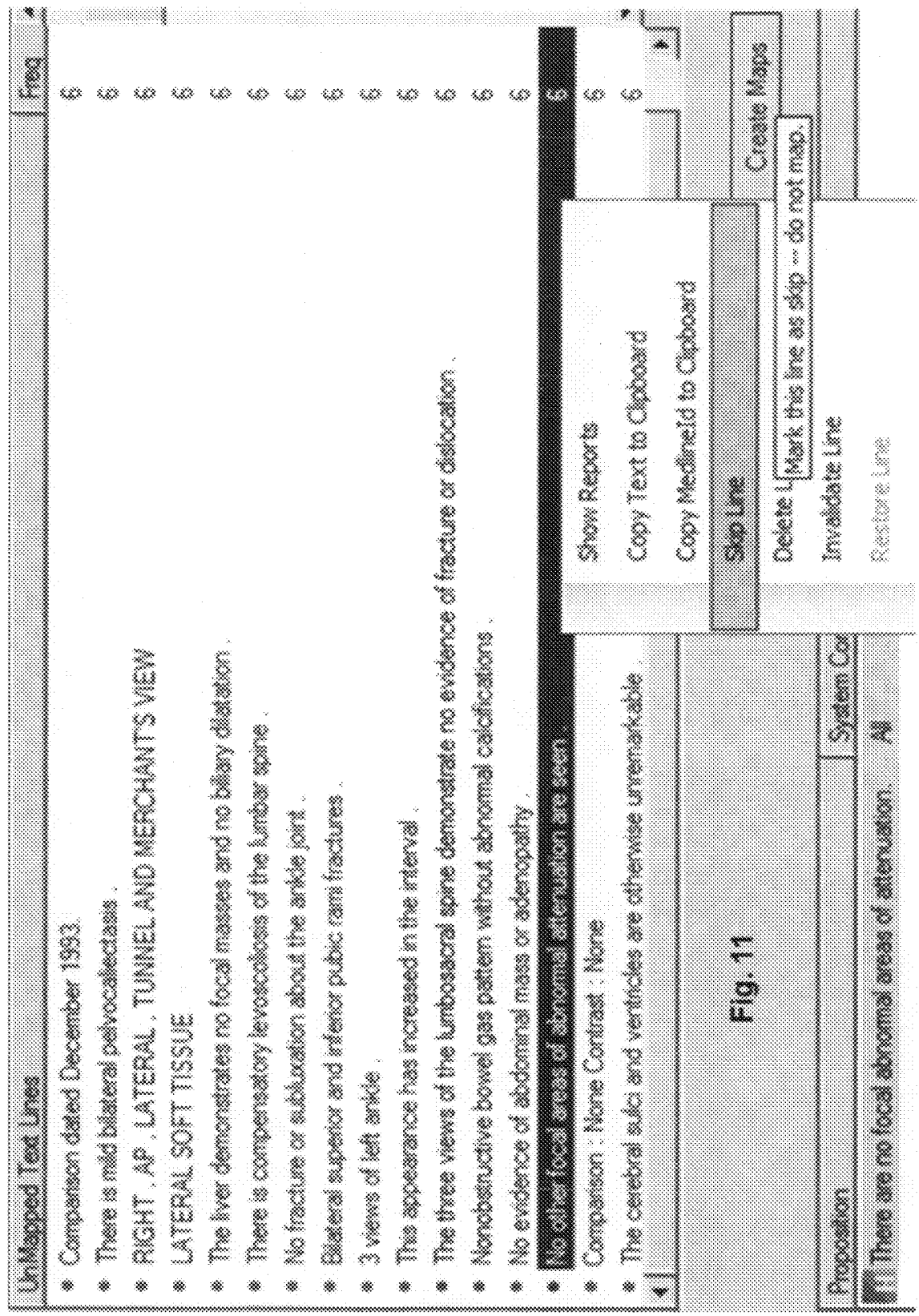
FIG. 11 is a bitmap rendering of a computer screen showing one component of the user interface of the knowledge editor that enables a domain expert to mark a sentence from the corpus as "Skip".

Occasionally the domain expert may identify sentences in the corpus which are either invalid (they do not make sense), they contain sensitive information (such as patient identifiable data), or can not be represented by the formalism of sentential logic. In these cases the domain expert can right click on the sentence in the knowledge editor (see FIG. 11) and mark the sentence with a special attribute such as skip, delete, or invalid as required. The ability of a domain expert to identify and mark these sentences improves the quality of semantic indexing since these sentences are excluded from the semantic mapping table.

The lower half of the window in FIG. 10 shows previously mapped sentences to the target sentence. The freetexttable function of the full text search engine of the Microsoft Sql2000 RDBMS finds similar sentences to the target sentence based on matching keywords (stop words are ignored). If the domain expert checks one of these sentences the corresponding propositions for this mapped sentence are copied/mapped to the target sentence. Thus as more of the corpus is mapped it becomes easier to annotate new sentences because close matches exist. The mapped sentences are displayed in order of relevance rank.

Figure 5A:
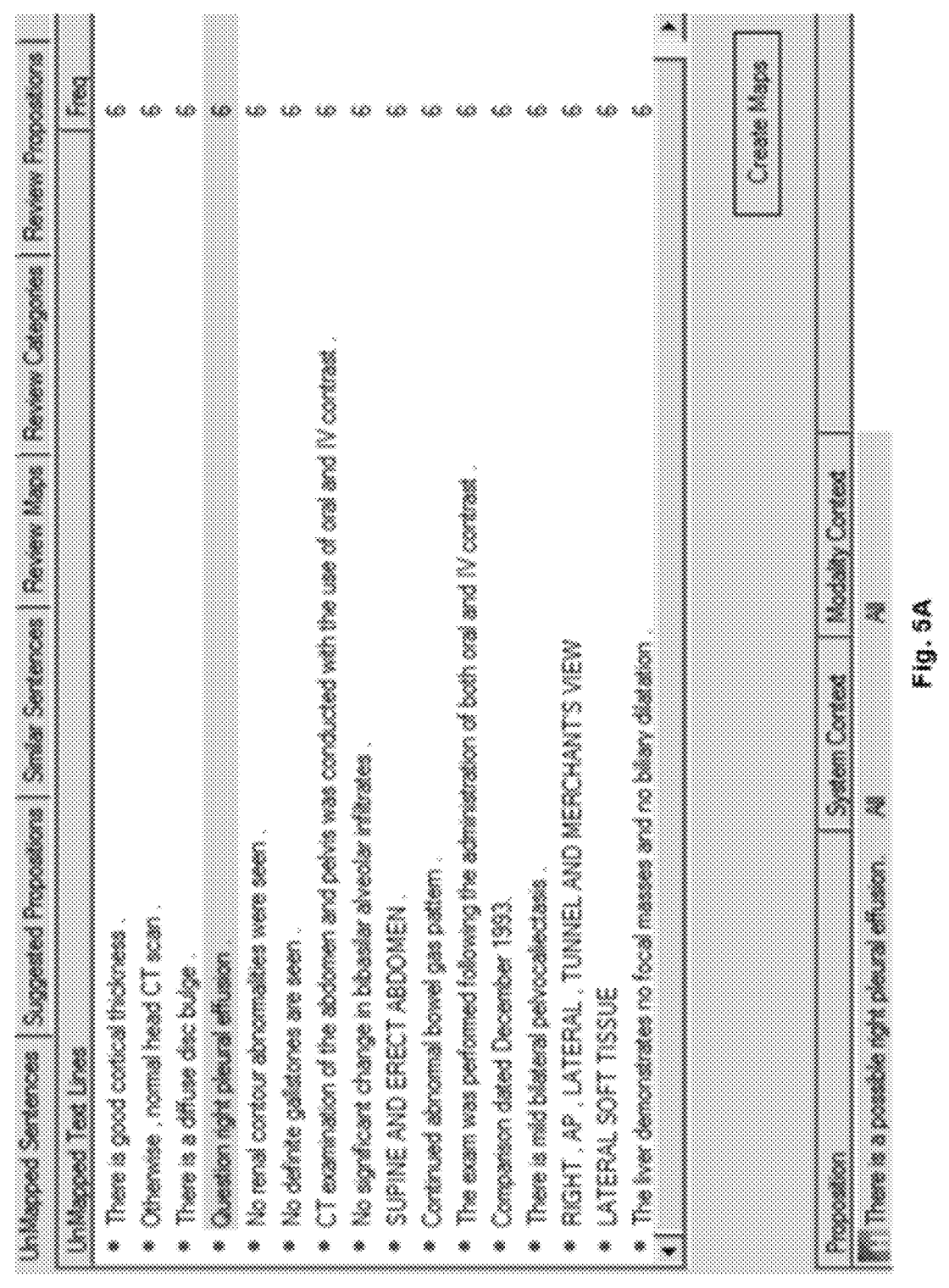

FIG. 5A illustrates components of the knowledge editor that implements the sentence mapping to proposition aspect of the invention. The upper window displays sentences from the unique sentence table ordered from highest to lowest frequency count in the corpus. The domain expert can select a particular sentence, which is then displayed in reverse video. The knowledge editor then displays one or more "hypothesized propositions" in the lower window. In the exemplary embodiment the hypothesized propositions are those propositions that correspond to the best previously mapped sentence in the corpus. Additionally by comparing the tokens in the target sentence to the best known sentence, hypothesized propositions can be refined through a substitution and query process. For example if the best hypothesized proposition is "There is a left pleural effusion", and the target sentence is "A right pleural effusion is seen", the system attempts a substitution of "left" for "right" in order to create a better propositional hypothesis.

Figure 5B:
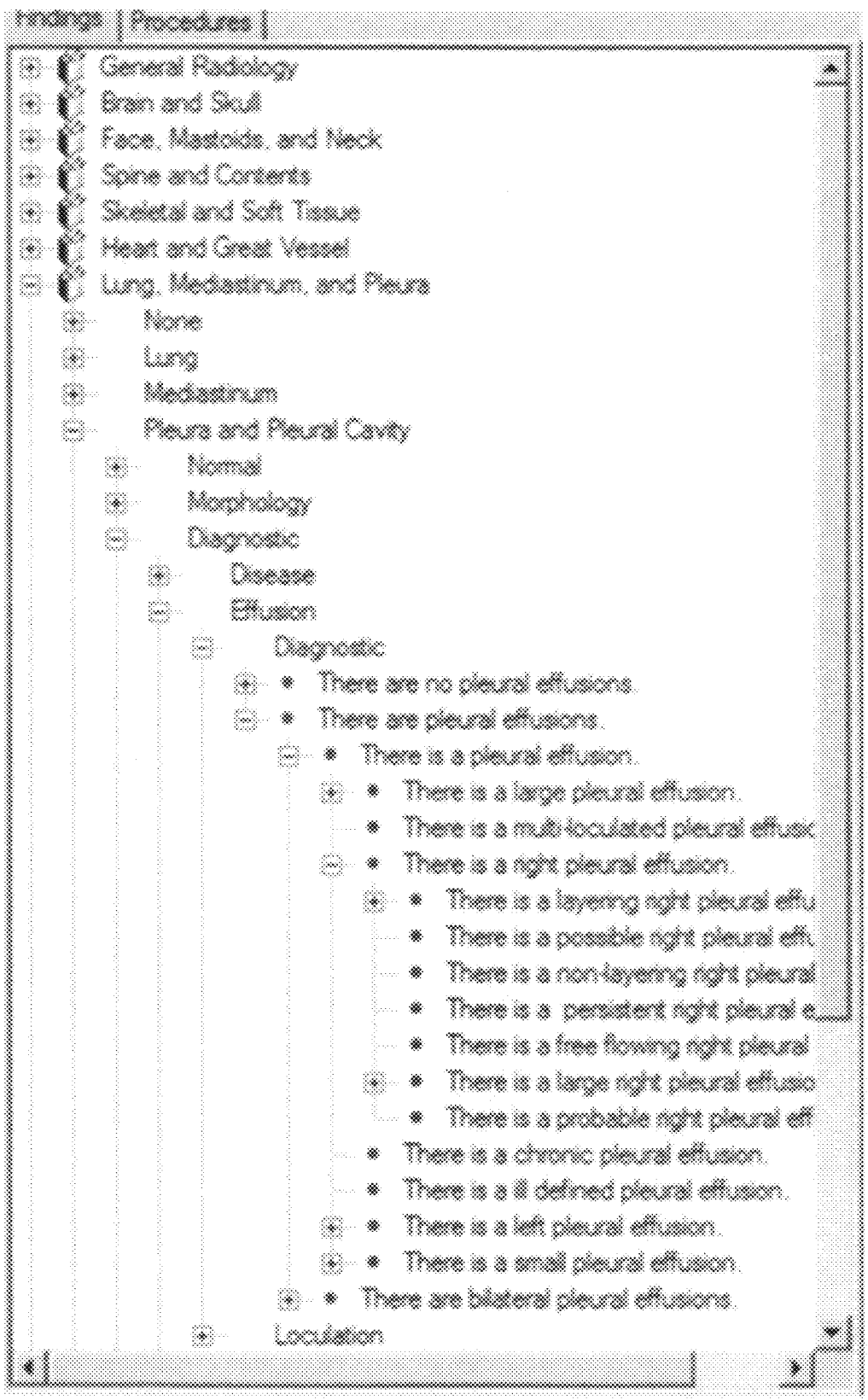
FIG. 5B is a rendering of a computer screen depicting the user interface of one component of the knowledge-editor that shows sentential propositions arranged in tree form.

FIG. 5B illustrates a component of the knowledge editor that helps the domain expert confirm this is the best proposition. The knowledge editor expands that part of the knowledge base (depicted in tree form) which surrounds the proposition selected by the domain expert. In the example shown, the expert selected the proposition "There is a possible right pleural effusion." The tree is constructed by the domain expert creating proposition nodes that are also stored in the relational database management system. Each of the nodes can be easily "dragged" and "dropped" to a new location in the tree. The nodes of the tree can be easily searched based on the string characteristics. Tree search/navigation is a well known in the art of computer science.

FIG. 5C illustrates a computer window in the knowledge editor that enables a domain expert to create a new proposition. When the domain expert selects a node in the knowledge base, a context menu offers the option to create a new proposition node. The new proposition becomes a child to the parent. The domain expert creates the exact wording of the propositional statement. A unique logical identifier is stored in the relational database management system for each proposition. Usually, the new proposition is closely related to the parent proposition. However, if it is misclassified it can be easily moved to another location in the knowledge hierarchy by dragging and dropping the node on top of a new parent. Corresponding changes are made in the relational database management system. Additionally, the domain expert can characterize the semantic "type". In the preferred embodiment the domain expert can specify whether a sentential proposition is a normal finding, abnormal finding, normal conclusion, or abnormal conclusion. This is useful for medical reports because it enables sorting corresponding sentences into normal and abnormal. Those knowledgeable in the art of natural language processing could easily create other semantic "types" that would be useful for their knowledge domains.

Figure 5D:
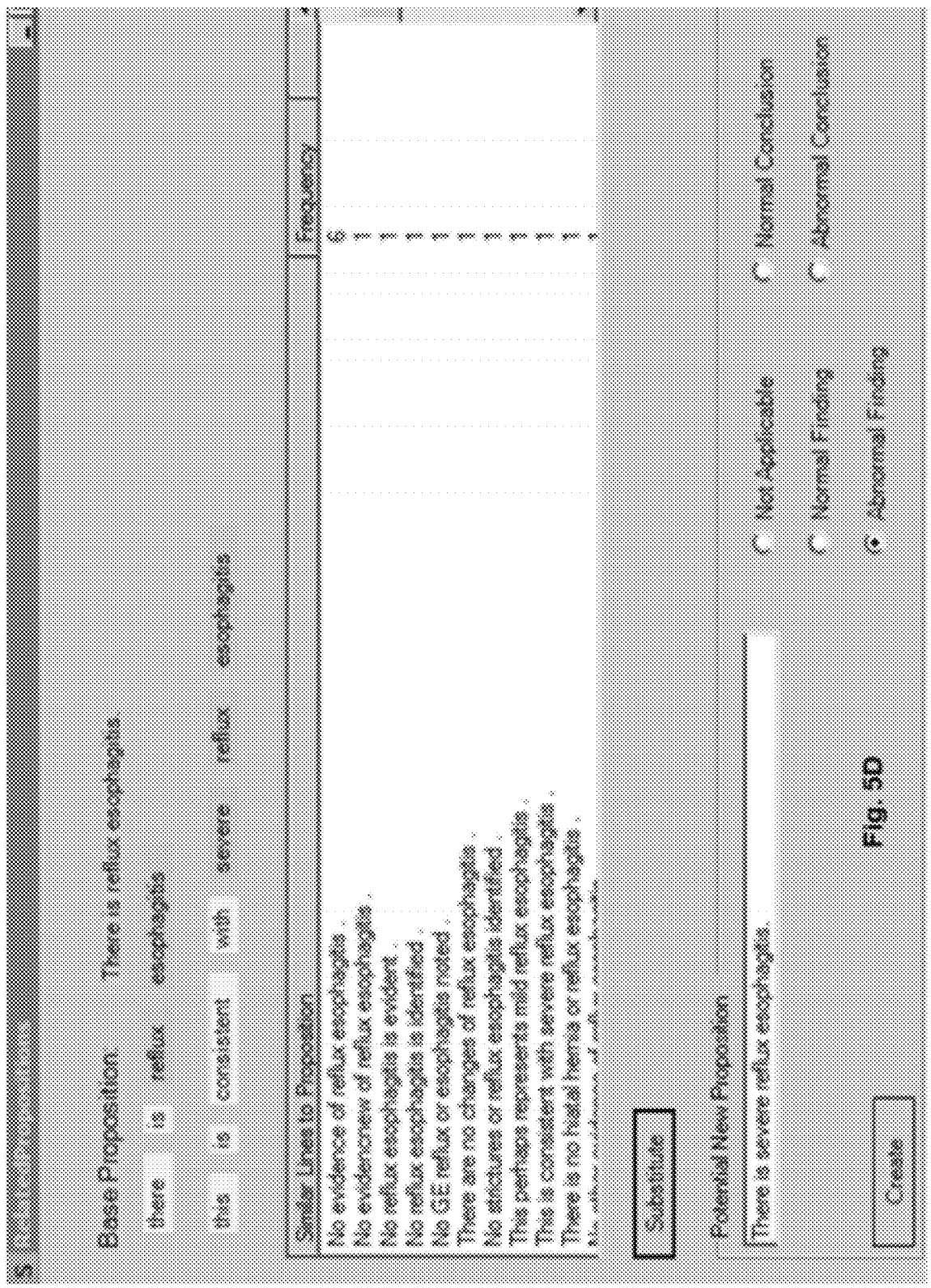
FIG. 5D is a rendering of a computer screen depicting the user interface of one component of the knowledge-editor that enables a domain expert to quickly create a series of related propositions.

FIG. 5D illustrates another computer window in the knowledge editor that enables a domain expert to quickly create a series of related propositions. A free text search of the corpus displays related sentences to a base proposition. The domain expert can then select word tokens in these sentences to substitute in the base proposition in order to create new propositions. The textbox enables the domain expert to precisely specify the wording of these new propositions. This capability is critically important; otherwise, irrelevant words or confusing concepts could be made into propositions and added to the knowledge base. This is a drawback found in many fully automated semantic indexing systems.

Careful judgments about semantic equivalence of similar sentences are required from the domain expert. In the exemplary embodiment, the frame of reference is the person reading the document. Thus, if the domain expert saw one semantically equivalent sentence substituted for another, the two sentences would be judged to be semantically equivalent, if this person believes they map to the same sentential proposition(s).

Conjunction

Conjunction is a prominent linguistic construct, yet it adds complexity to the knowledge representation scheme because if every compound sentential proposition is treated as atomic there would be an explosion of sentential propositions. In the preferred embodiment the meaning of compound subjects, predicates, and sentences are represented by multiple simple sentential propositions from the knowledge base. Some examples are shown.

Predicate Conjunction: The bony structures are intact and normal in density. Sentential propositions: (1) The bones are normal. (2) The bones are of normal density. Subject Conjunction: The heart and mediastinum are within normal limits. Sentential propositions: (1) The heart is normal. (2) The mediastinum is normal. Sentence Conjunction: The lung fields are clear and there is no evidence of infiltrate. Sentential propositions: (1) The lungs are clear. (2) There is no evidence of pulmonary infiltrate. In each case the domain expert using the flowchart in figure four reduces to simple sentences the compound subject, predicate, or sentence to a simple or complex sentence prior to mapping.

While "or" constructs are common in documents they most often signify conjunction rather than disjunction, which can be annotated to multiple simple sentential proposition(s). Some examples include: "No fractures [or] dislocations are seen." "No acute fracture [or] dislocation." "No focal infiltrates, atelectasis [or] effusions are seen." "No microcalcifications [or] local architectural distortions can be seen to suggest malignancy." "No masses [or] adenopathy are identified."

The domain expert uses the method documented in the flowchart of FIG. 4 to map/annotate compound subjects, predicates, and sentences. First, the domain expert determines in step 404 the type of compounding. If the target sentence has multiple independent clauses, it is broken up into two or more simple sentences or independent clauses in step 406, prior to classification step 314. If the sentence has a compound subject with a simple predicate, each subject-predicate pair is formed as a simple sentence in step 410 prior to classification step 314. Thus "the heart and lungs are normal" becomes "the heart is normal" and "the lungs are normal". Likewise, if the sentence has a compound predicate with a simple subject, each subject-predicate pair is formed, step 412, prior to classification step 314. For example, "the ventricles are normal in size and position" becomes "the ventricles are normal in size" and "the ventricles are normal in position". Occasionally sentences have compound subjects and predicates, in which case a list of all combinations of subject-predicate pairs are created prior to classification. For example, "the ventricles and sulci show no evidence of mass effect or midline shift" becomes: 1. "The ventricles show no evidence of mass effect." 2. "The sulci show no evidence of mass effect." 3. "The ventricles show no evidence of midline shift." 4. "The sulci show no evidence of midline shift." The steps of this method require human judgment. While it may be desirable to reduce sentences with compound subjects, compound predicates, and compound sentences themselves to simple sentences automatically, current grammar based parsers can not do this accurately for the diverse sentence composition of a large scale corpus. Thus the domain expert performs an analysis.

The knowledge editor is often able to predict each proposition needed to map a compound sentence by looking up a similar sentence that had been previously mapped. However, this is not always the case. The domain expert can use the built in tools in FIGS. 5A, 5B, 5C, and 5D to either find the correct proposition or create new propositions as needed.

Context Marker

Domain experts bring contextual knowledge to the semantic annotation process. For example, in the preferred embodiment the sentence "No effusion is identified" is annotated to 'There are no pleural effusions' if the system context is 'Chest', and is annotated to 'There is no knee joint effusion' is the system context is 'Lower Extremity'. If the system context is unknown the sentence is annotated to 'There is no effusion', under the category of general radiology. For radiology reports, the system and procedure context lies outside the sentence but is usually known at the time the sentence is being annotated from the wider context of the document.

Sometimes the context of a compound sentence is contained in a portion of the sentence being analyzed. Consider the sentence "There is no evidence of infiltrate or adenopathy." The sentence can be unambiguously annotated to 'There is no evidence of pulmonary infiltrate' and 'There is no evidence of mediastinal adenopathy' without the need for a context maker. However, the sentence "There is no evidence of adenopathy' is ambiguous and requires a context marker since it could refer to mediastinal lymphadenopathy, retroperitoneal lymphadenopathy, etc. In this case the system context 'Chest' would limit the annotation to 'There is no evidence of mediastinal adenopathy.'

Context makers are added to a field in the mapping table that stores the relationship between the sentence and its propositions. The knowledge editor enables a domain expert to select a context marker from an enumerated lists of markers so that when an ambiguous sentence is annotated the relationship between the sentence and its propositions applies only under the given document/report context (i.e. the context marker). FIG. 6 shows a domain expert annotating the ambiguous "unmapped" sentence (601) 'Axial images were obtained without contrast and filmed in parenchymal windows' using one context category—modality context (603). This sentence is ambiguous because it is impossible to know from the sentence itself if the author is referring to an axial magnetic resonance imaging (MRI) study or an axial computed tomography study. The domain expert selects through a drop down box the modality context that matches the context of the report to the correct proposition. Thus if the report was a magnetic resonance imaging exam the sentence would be annotated to 'An axial MRI study was performed.' However, if the report was a computed tomography the sentence would be annotated to 'An axial computed tomography imaging study was performed. The context lies outside the sentence but within the report. Another context marker category is the system context (605) which is the region of the body that was studied. The exemplary embodiment uses two context marker categories, but any number of context categories and markers could be used. Those knowledgeable in the art could tailor the context categories and markers to the knowledge domain.

In many technical domains most of the sentences are context free and do not require context markers. However, in other domains where there may be many ambiguous sentences, context markers make semantic annotation feasible. Any number of context markers can be created depending upon the domain.

The Knowledge Hierarchy

The semantics of each sentence is thoughtfully considered by the domain expert to determine the target sentence's semantic equivalence, contextual equivalence, or subsumption to existing sentential propositions. Semantic equivalence is defined as two entire sentences that have the same semantic meaning. Semantic equivalence implies these sentences must be represented by the same propositions. Contextual equivalence is defined as two sentences judged semantically equivalent only after their context markers are specified. Subsumption is defined as the generality property of a sentential proposition where more general sentential propositions subsume more specific sentential propositions. Classifying sentences correctly is essential for making the knowledge base consistent and easily navigable. New material is always related to relevant ideas in the existing structure. The knowledge editor facilitates the use of subsumption by enabling the domain expert to organize meanings in the knowledge base from the most general to the most specific.

Consider the following example:

"The lungs are free of infiltrate."→"There are no acute infiltrates."→"There are no acute focal infiltrates."→"There is no definite acute focal infiltrate."

Each of these sentential propositions expresses a normal finding or conclusion about the lungs, but the top finding is more general than the rest. The sentential proposition, "There is no definite acute focal infiltrate," is weaker than "There are no acute focal infiltrates," yet the two sentential propositions are clearly related. The domain expert arranges these sentential propositions in a hierarchy and the system automatically sets the cross-reference field in the sentential proposition table so a database management system can easily extract all sentences annotated to either semantic meaning depending on the requirements of the user.

For sentential propositions that use logical implication, such as "Chest CT scan is recommended if clinically indicated", the present method creates a sentential proposition as a subsumed qualified sentential proposition: "Chest CT scan is recommended."→"Chest CT scan is recommended if clinically indicated."

Figure 7:
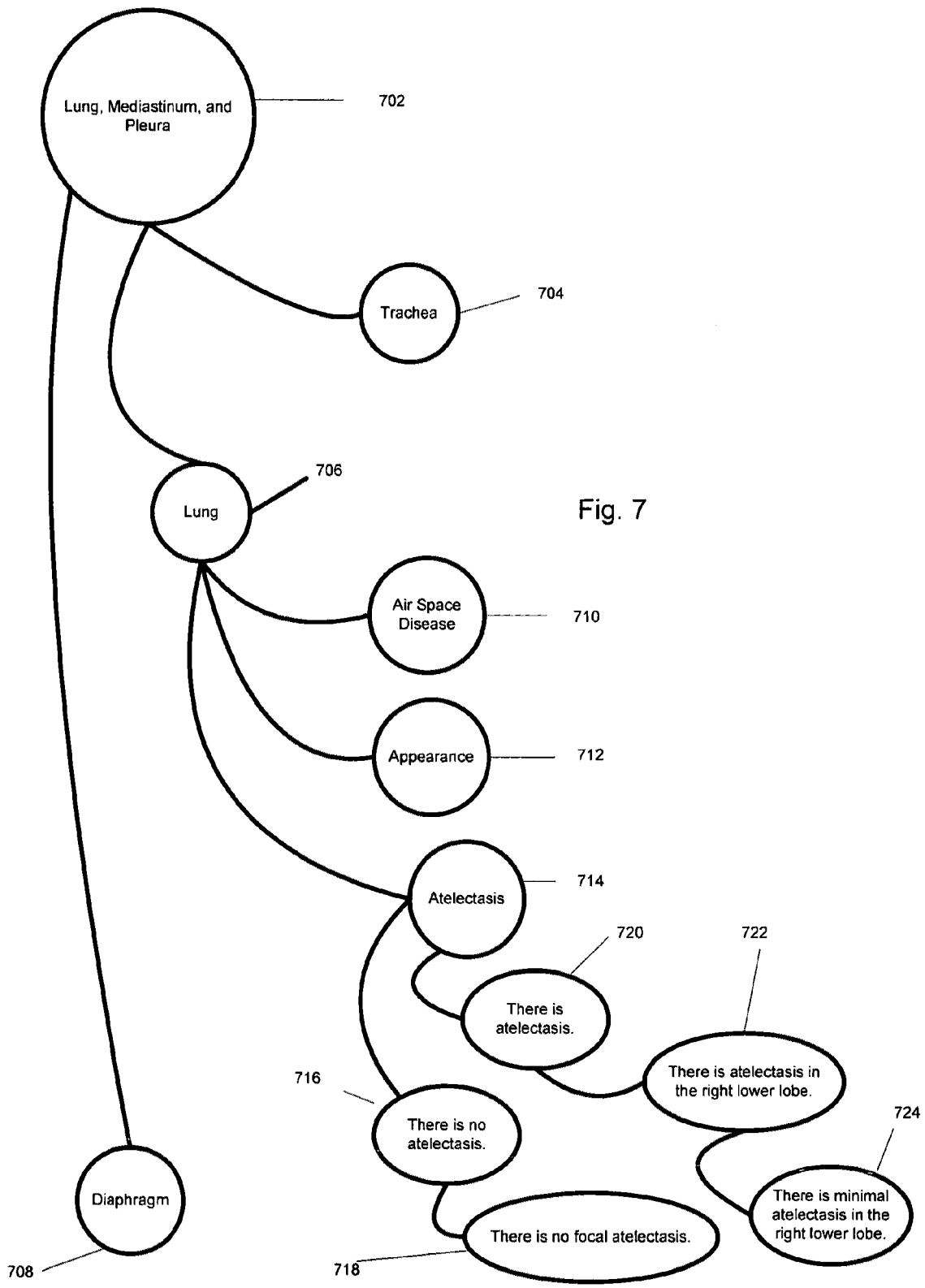
FIG. 7 is a diagram showing the arrangement of general and specific propositions further arranged in a hierarchy of anatomic and functional categories.

FIG. 7 depicts one example for classifying the sentential propositions in a hierarchy for lung atelectasis. Knowledge node 702 represents knowledge from a general class, major anatomy, nodes 704, 706, and 708 represents knowledge from the class, minor anatomy. Nodes 710, 712, and 714 represent semantic knowledge from a physiologic class. Nodes 720, 722, and 724 are linked sentential propositions that start with the most general sentential proposition, "There is atelectasis", to the more qualified sentential proposition "There is atelectasis in the right lower lobe", and finally an even more qualified sentential proposition "There is minimal atelectasis in the right lower lobe." Nodes 716 and 718 show a similar arrangement for negated sentential propositions. The sentential propositional hierarchy can be created to any level of specificity needed by the domain expert. Different hierarchies would be designed by those skilled in the art of creating knowledge taxonomies for other domains.

Negation

Only true sentential propositions are allowed in the knowledge base. This makes it easy to annotate sentences to sentential proposition(s) in the knowledge base, and perform statistical analysis or data mining. Yet, in some domains like medicine many sentences are of the form "There is no evidence of". For example, there is no evidence of any lung abnormality. In the preferred embodiment negated concepts are represented in the knowledge base directly; subsumed in this example under the statement the lungs are normal. In contrast, traditional sentential logic would typically represent this as a compound sentential proposition with a negation operator applied to a non-negated form. The preferred embodiment, in contrast, uses a more direct representation to make navigation within the knowledge base easier, and to better preserve the correspondence between the linguistic structure of the sentence and the semantic knowledge being expressed. This approach also makes it easier for domain experts to create sentential propositions and for end-users to locate sentential propositions.

In the exemplary embodiment, all the sentential propositions in the knowledge base are characterized as normal findings, abnormal findings, normal conclusions, abnormal conclusions, or not applicable. This is visually displayed to domain experts in the form of color-coding prefixes for each semantic type. In the exemplary embodiment, green indicates a normal finding or conclusion, red an abnormal finding or conclusion, and black not applicable. Other alternate feature-dimensions could be used for classifying sentential propositions and other colors or unique identifying symbols could be employed.

System Components

Figure 8:
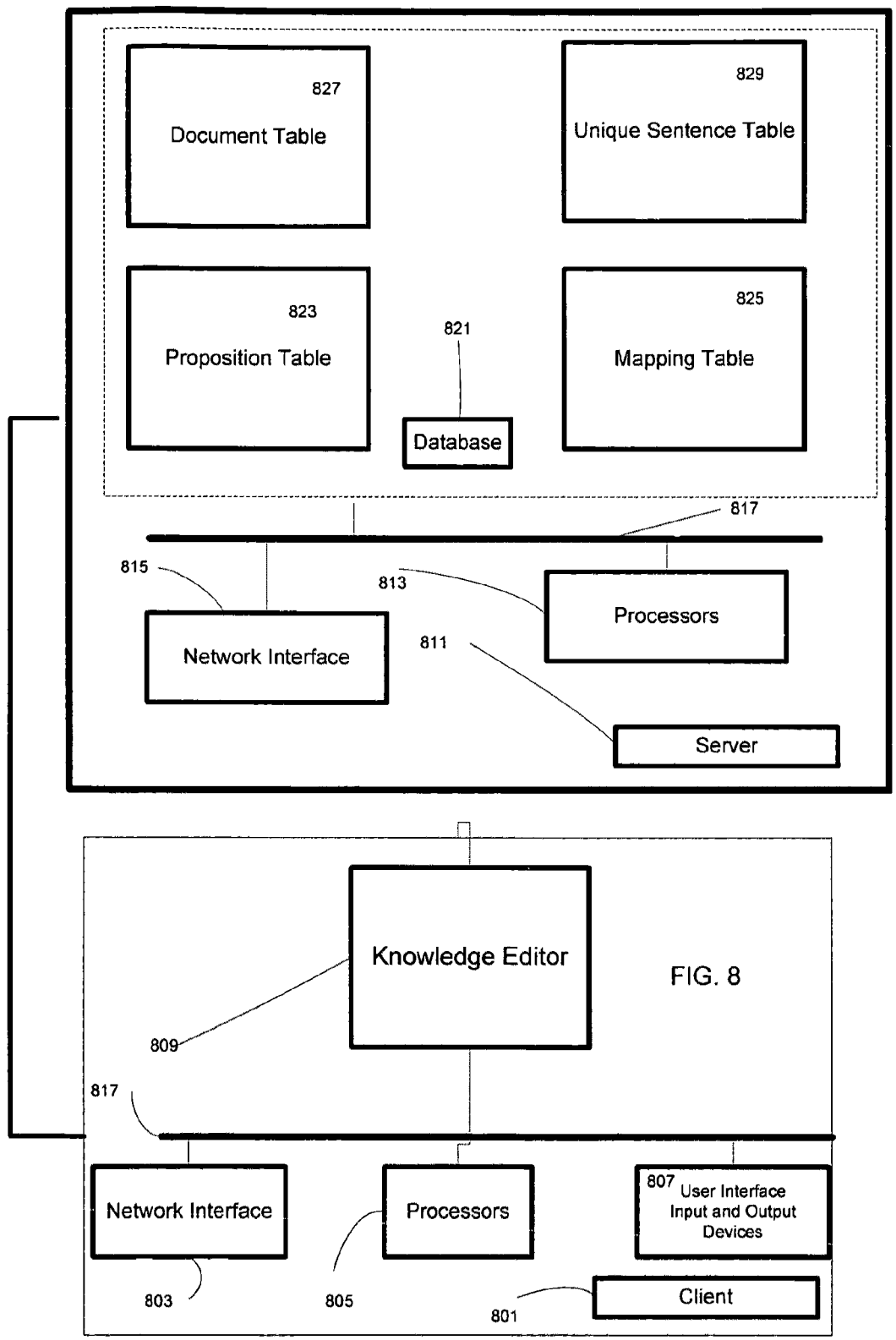
FIG. 8 is a diagram showing the main components of the invention.

FIG. 8 is a block diagram of a computer system that depicts the semantic editor, knowledge base, and semantic mapping table of the invention. These components of the invention would typically be implemented with a client server architecture which includes a server (811) and one or more clients (801). The server receives instructions from the knowledge editor program (809) running on the client to perform various database (821) operations that include making entries, deletions, and updates in the proposition table (823), document table (827), unique sentence table (829), semantic mapping table (825), and semantic map review table (not shown). However, the client and server could be implemented on a single computer. The other components of the system are well known in the art including a network interface (815), processors (805, 813), and input and output devices (807).

Knowledge Editor

FIG. 5 shows parts of the knowledge base editor that enable domain experts to annotate sentences in the knowledge domain. Component 502 shows the hierarchical arrangement of sentential propositions in the knowledge base. Sentential propositions are placed in a hierarchy from the most general sentential proposition to the most specific. Component 504 shows the sentences from the corpus arranged in order of frequency from the highest to the lowest. Component 506 displays all the sentential propositions the domain expert has annotated for the selected sentence. The editor enables the domain expert to add or delete these sentential propositions. For example, when a domain expert "right clicks" a specific sentential proposition one of several options is to "delete" the proposition. If the domain expert selects "delete", the node is removed from the knowledge base tree and the row in the proposition table corresponding to that sentential proposition. The knowledge-editor enables the domain expert to drag a node from the sentential propositional hierarchy and place it under a new node of another portion of the hierarchy.

Figure 9:
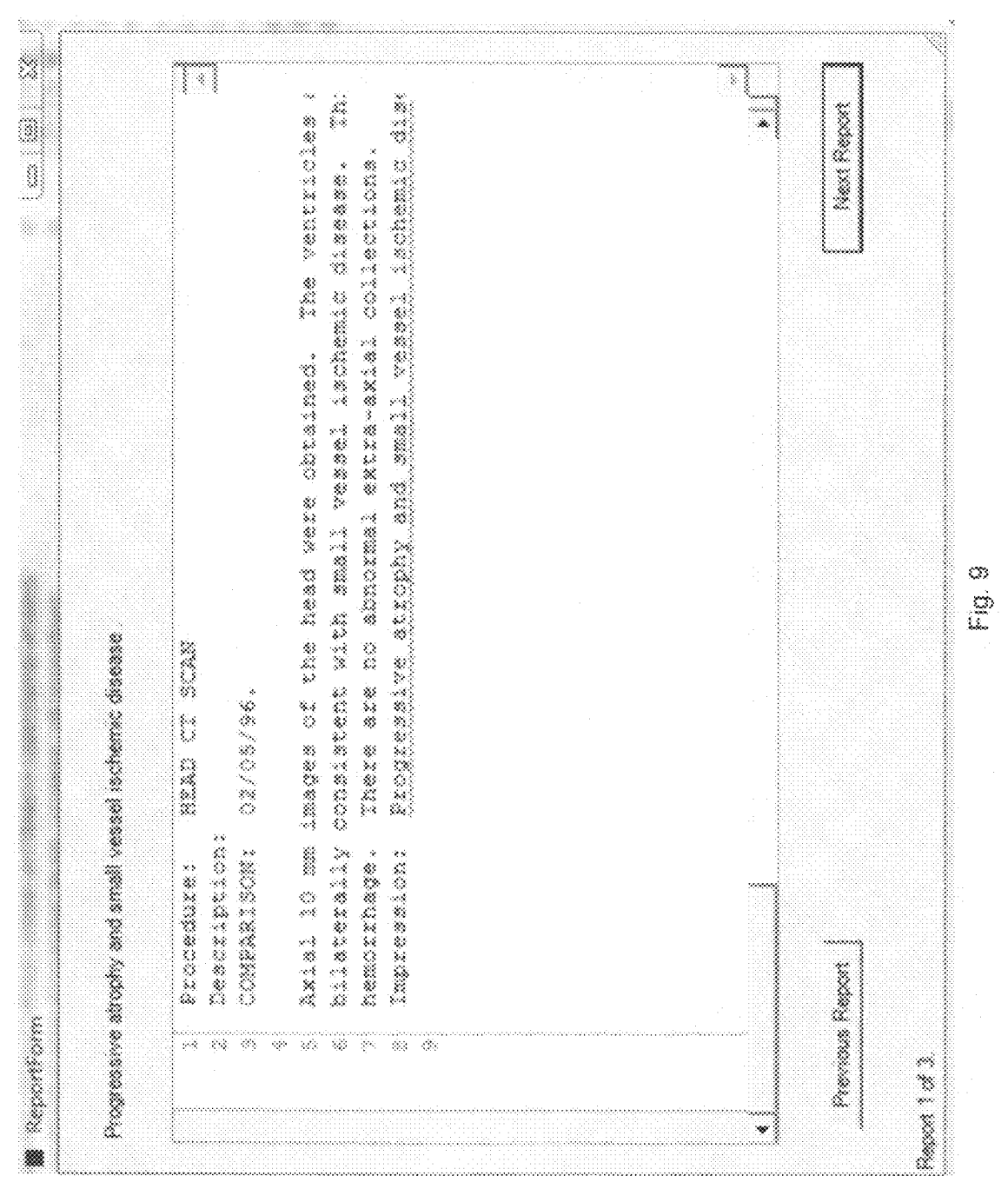

The knowledge-editor on user command can display in a separate window all the documents for each sentence being classified from the corpus to enable domain experts to appreciate the wider context of the sentence being classified (FIG. 9). The index table created in step 206 maintains the correspondence between every sentence and the corresponding document. Retrieving the corresponding document is straightforward for those knowledgeable in the art of relational database systems.

Figure 12:
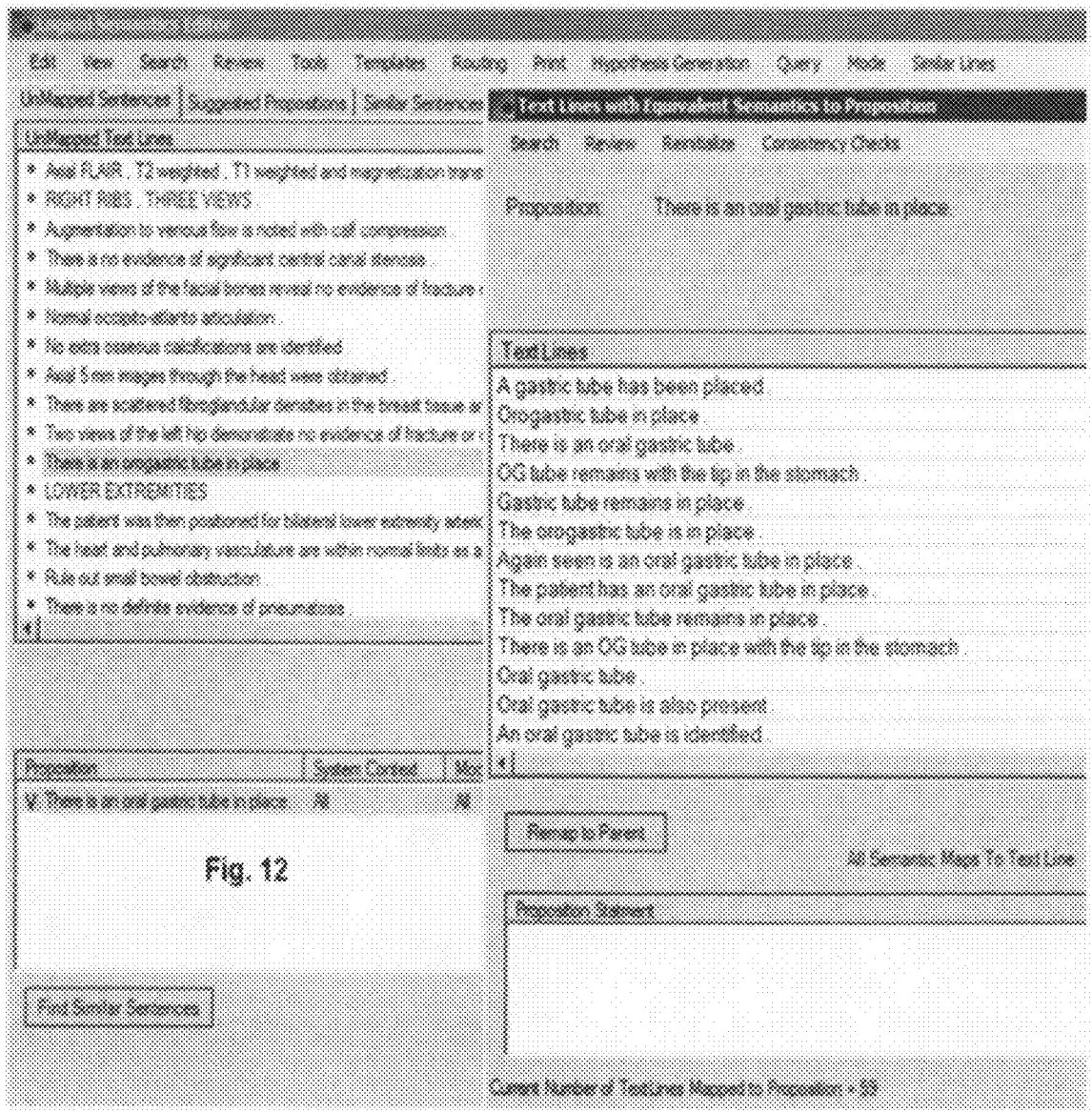
FIG. 12 is a bitmap rendering of a computer screen showing one component of the user interface of the knowledge editor that enables a domain expert to see all the sentences mapped to a given sentential proposition.

The knowledge-editor also enables the domain expert to understand the past mapping decisions of sentences to particular propositions in order to ensure that semantically equivalent sentences are mapped to the same proposition(s). By "right clicking" on a proposition node (see FIG. 12) the editor will display all the sentences that have been mapped to that sentential proposition. This is extremely useful when mapping slightly ambiguous sentences.

Database Design

The top portion of FIG. 8 depicts the exemplary embodiment of the server system (811) of the invention. The database component (821) is implemented by relational database tables for documents (827), unique sentences (829), propositions (823), and semantic mapping (825). Every row in these tables is indexed by a primary key consisting of a globally unique identifier. This simple schema implements the objects of the method to capture the sentences, sentential propositions, and mapping from sentences to propositions for a document corpus. Additional supporting tables can be added to further characterize sentential propositional attributes, by those knowledgeable in the art of database design. The mapping table links the unique sentences in the corpus to the sentential propositions in the knowledge base. A map review table tracks the domain expert who made the initial mapping and the reviewer who approved or corrected the semantic map(s). By those knowledgeable in the art, simple database queries of these tables makes it possible to count the number of sentences annotated in the corpus, and the percentage of the corpus that has been annotated.

Sentential propositions are represented in the exemplary embodiment by unique identifiers, for example: 20EB75BD-56B2-41A3-9DBC-0014743A8964 represents "There is fibroglandular tissue present in the breast." 70C233FD-AB03-48C9-9124-00198A0D71DB represents "The basal ganglia are normal." D740048F-06D4-4ED1-AB0C-00671C02F9B5 represents "There are multiple left rib fractures."

Semantically equivalent sentences are annotated to the same sentential propositions, by linking sentences like "The breast shows evidence of fibroglandular tissue.", or "Fibroglandular tissue is apparent from the breast region", to same identifier 70C233FD-AB03-48C9-9124-00198A0D71DB in the mapping table.

The present invention may be embodied in other specific forms without departing from the spirit or essential characteristics. The described embodiments are to be considered in all respects only as illustrative and not restrictive. The scope of the invention is, therefore, indicated by the claims rather than the foregoing description. All changes that come within the meaning and range of the equivalency of the claims are to be embraced within their scope Description and Operation of Alternative Embodiments The knowledge base could be designed to contain compound sentential propositions. This would not entail any changes in the schema to represent the knowledge. However, domain experts would make different choices for annotating a sentence from the domain to this type of sentential proposition. Specifically, rules would need to be created that specify when a sentence should be annotated to multiple simple sentential propositions or compound sentential propositions. Those skilled in the art of knowledge representation or natural language processing could devise these rules.

Instead of annotating complete sentences, a domain expert could annotate sentence fragments to propositions. This would require no change in methodology or architecture.

As described in the specification the knowledge hierarchy could be devised with a number of different classification dimensions.

Although the description above contains many specifics, these should not be construed as limiting the scope of the invention but as merely providing illustrations of some of the exemplary embodiments. For example, the method could be used to build knowledge bases in law, science, business administration, and many other fields. Thus the scope of the invention should be determined by the appended claims and their legal equivalents, rather than by the examples given.

What is claimed is:

1. A computer assisted method for creating a semantic knowledge base for a document corpus describing physical or tangible objects, consisting of unique sentential propositions, said method comprising the steps of:
   (a) segmenting at least a portion of a document corpus into individual sentences using a computer processor; and
   (b) reducing each said sentence to one or more simple or complex sentences; and
   (c) displaying candidate propositions to a domain expert for each said simple or complex sentence using a computer processor; and
   (d) said domain expert creating a unique sentential proposition to represent the entire meaning for each said simple or complex sentence whose meaning is not represented in said knowledge base using a knowledge editor; and
   (e) adding said sentential proposition(s) using a computer processor to said knowledge base, wherein a single sentential proposition represents the entire meaning of a simple or complex sentence.

2. The method of claim 1 wherein a new sentential proposition is placed in a knowledge hierarchy characterized by relationships that may include subsumption, "is-a", "part-of", and causal relationships.

3. The method of claim 1 wherein sentences from the document corpus are displayed in the knowledge editor in order of frequency.

4. The method of claim 1 wherein a selected sentence from the corpus is displayed in a knowledge editor window that includes the documents from which the sentence is derived.

5. The method of claim 1 wherein a newly created sentential proposition is further characterized by its semantic type.

6. The method of claim 1 wherein a sentential proposition is further displayed in a knowledge editor with a distinctive mark, or unique color, depending on the semantic type.

7. The method of claim 1 wherein candidate sentential propositions that may represent the meaning of a selected sentence are retrieved based on their string similarity to sentential propositions in the knowledge base.

8. The method of claim 1 wherein candidate sentential propositions that may represent the meaning of a selected sentence from the corpus are retrieved based on their string similarity to previously mapped sentences in the corpus.

9. The method of claim 1 wherein an unmappable sentence from the corpus is marked with the attribute "delete", "invalid", or "skip" or similar attribute.

10. A computer assisted method for creating a semantic mapping table consisting of associations between a sentence from a corpus and sentential propositions in a knowledge base describing physical or tangible objects, comprising the steps of:
   a. reducing each said sentence to one or more said simple or complex sentences; and
   b. for each said simple or complex sentence using a computer processor to display candidate propositions which may represent the entire meaning of said simple or complex sentence to a domain expert; and
   c. said domain expert using a knowledge editor to associate one said candidate sentential proposition for each said simple or complex sentence; and,
   d. storing said associations using a computer processor in said mapping table, wherein a single sentential proposition represents the entire meaning of a simple or complex sentence.

11. The method of claim 10 wherein the associations are further qualified by one or more context markers.

12. The method of claim 10 wherein candidate sentential propositions that may represent the meaning of a selected sentence are retrieved based on their string similarity to sentential propositions in the knowledge base.

13. The method of claim 10 wherein candidate sentential propositions that may represent the meaning of a selected sentence from the corpus are retrieved based on their string similarity to previously mapped sentences in the corpus.

14. The method of claim 10 wherein similar sentences are found in the corpus and mapped to the same propositions.

* * * * *